US008023494B2

(12) United States Patent
Takeda

(10) Patent No.: US 8,023,494 B2
(45) Date of Patent: Sep. 20, 2011

(54) COMMUNICATION SERVICE CONTINUATION SYSTEM, COMMUNICATION SERVICE CONTINUATION METHOD, AND PROGRAM THEREOF

(75) Inventor: Kenji Takeda, Tokyo (JP)

(73) Assignee: NEC Corporation, Tokyo (JP)

( * ) Notice: Subject to any disclaimer, the term of this patent is extended or adjusted under 35 U.S.C. 154(b) by 932 days.

(21) Appl. No.: 11/871,034

(22) Filed: Oct. 11, 2007

(65) Prior Publication Data

US 2008/0107059 A1    May 8, 2008

(30) Foreign Application Priority Data

Nov. 6, 2006   (JP) .................................. 2006-300822

(51) Int. Cl.
*H04J 3/06* (2006.01)
*H04J 3/04* (2006.01)
*H04L 12/50* (2006.01)
(52) U.S. Cl. .......................... 370/350; 370/366; 370/536
(58) Field of Classification Search .................. 370/331, 370/350, 366, 536
See application file for complete search history.

(56) References Cited

U.S. PATENT DOCUMENTS

| 2003/0035410 | A1* | 2/2003 | Laroia et al. | 370/350 |
| 2004/0092276 | A1* | 5/2004 | Dooley | 455/504 |
| 2006/0276193 | A1* | 12/2006 | Itzkovitz et al. | 455/445 |
| 2007/0036106 | A1* | 2/2007 | Karl et al. | 370/331 |

FOREIGN PATENT DOCUMENTS

| EP | 577322 A1 * | 1/1994 |
| EP | 0854610 A2 | 7/1998 |
| EP | 1370041 A1 | 12/2003 |
| JP | 9-508773 A | 9/1997 |
| JP | 2002520941 A | 7/2002 |
| JP | 2003153327 | 5/2003 |
| JP | 2004274458 A | 9/2004 |
| JP | 2006222822 A | 8/2006 |
| WO | 0013376 A1 | 3/2000 |
| WO | 2004079997 A1 | 9/2004 |

OTHER PUBLICATIONS

Machine Translation of JP2003-153327.*
European Search Report for EP Application No. 07118795.9, dated Feb. 28, 2008.
Japanese Office Action for JP2006-300822 issued Jul. 19, 2011.

\* cited by examiner

*Primary Examiner* — Ricky Ngo
*Assistant Examiner* — Paul Masur

(57) ABSTRACT

In a mobile terminal in which a communication service is being executed, communication networks can be switched without causing a loss of communication data while maintaining the execution of the communication service. In a server which provides a communication service via communication networks provided in parallel and a mobile terminal which obtains the communication service using one of the communication networks, the mobile terminal activates another communication network in parallel while maintaining execution of the communication service to thereby transmit pieces of information having the same content, generated by copying, through the respective communication networks, and switches the one communication network being used to the other communication network.

11 Claims, 11 Drawing Sheets

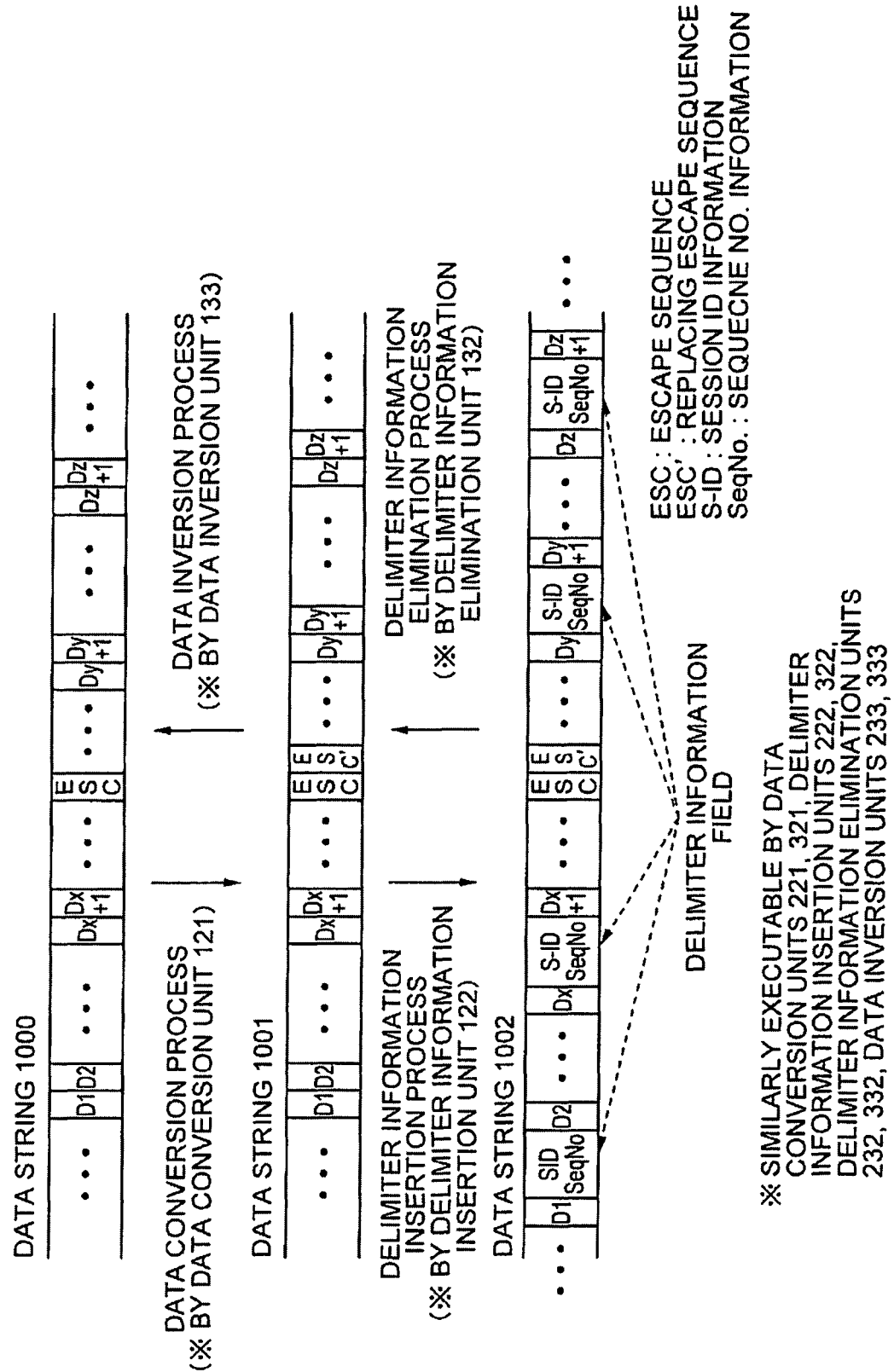

FIG. 4

DELIMITER INFORMATION FIELD EXEMPLARY CONFIGURATION 1

| ESC | SESSION ID FIELD (FIXED LENGTH) | SEQUENCE NO. FIELD (FIXED LENGTH) |
|---|---|---|

DELIMITER INFORMATION FIELD EXEMPLARY CONFIGURATION 2

| ESC | SESSION ID FIELD (FIXED LENGTH) | ESC | SEQUENCE NO. FIELD (VARIABLE LENGTH) | ESC |
|---|---|---|---|---|

DELIMITER INFORMATION FIELD EXEMPLARY CONFIGURATION 3

| ESC | SESSION ID FIELD (VARIABLE LENGTH) | ESC | SEQUENCE NO. FIELD (VARIABLE LENGTH) | ESC |
|---|---|---|---|---|

IF SAME DATA AS ESCAPE SEQUENCE EXISTS IN VARIABLE-LENGTH FIELD, CONVERSION/INVERSION WILL BE PERFORMED BETWEEN ESCAPE SEQUENCE AND ESCAPE SEQUENCE+REPLACING ESCAPE SEQUENCE. SIMILAR TO DATA CONVERSION/INVERSION PROCESS. FURTHER, SESSION ID FIELD INDICATES FIELD FOR SESSION ID INFORMATION.

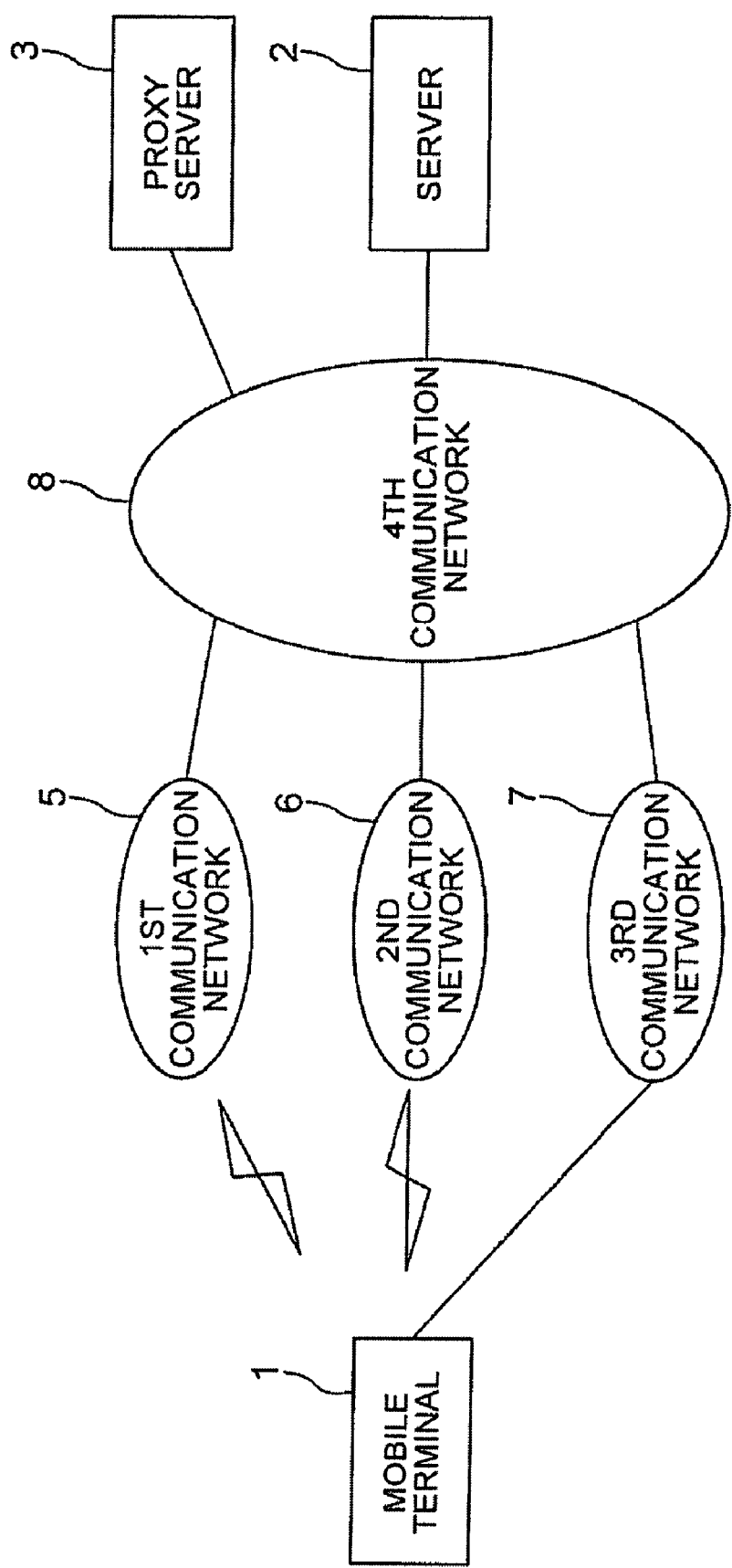

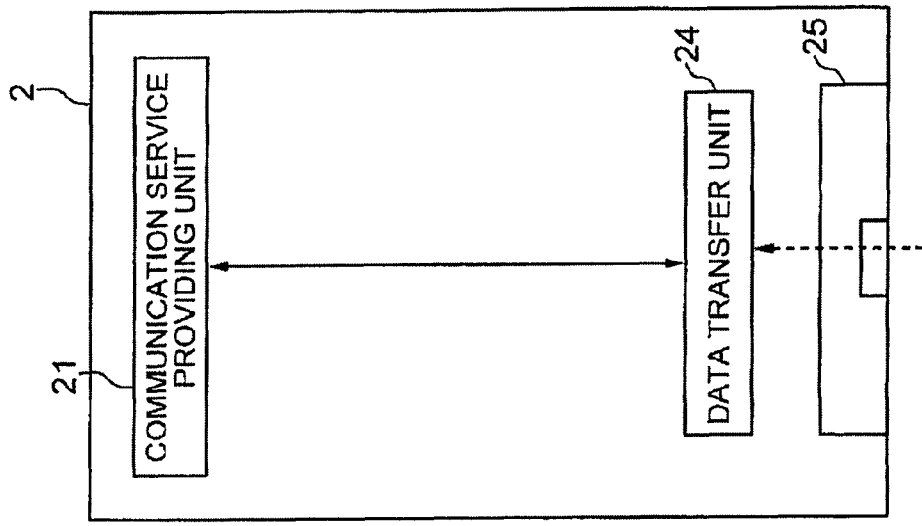
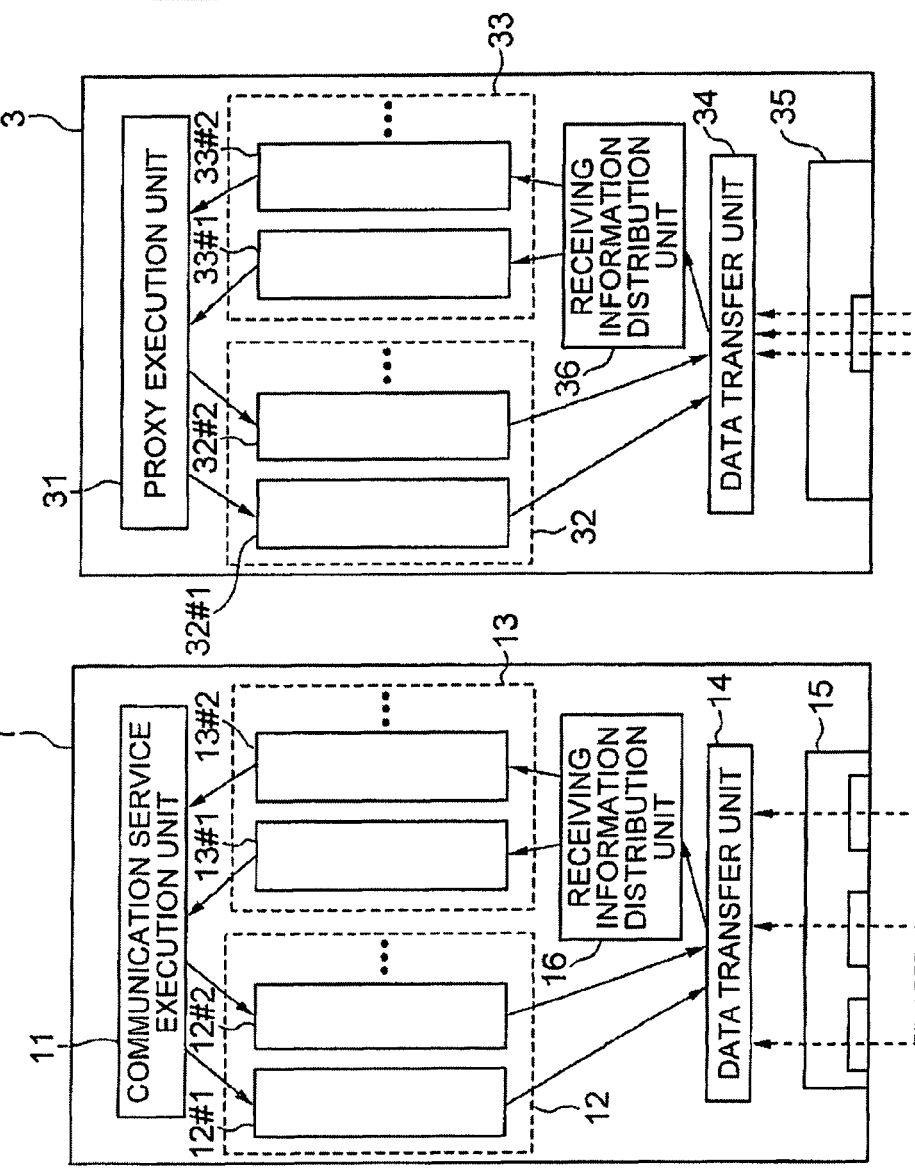

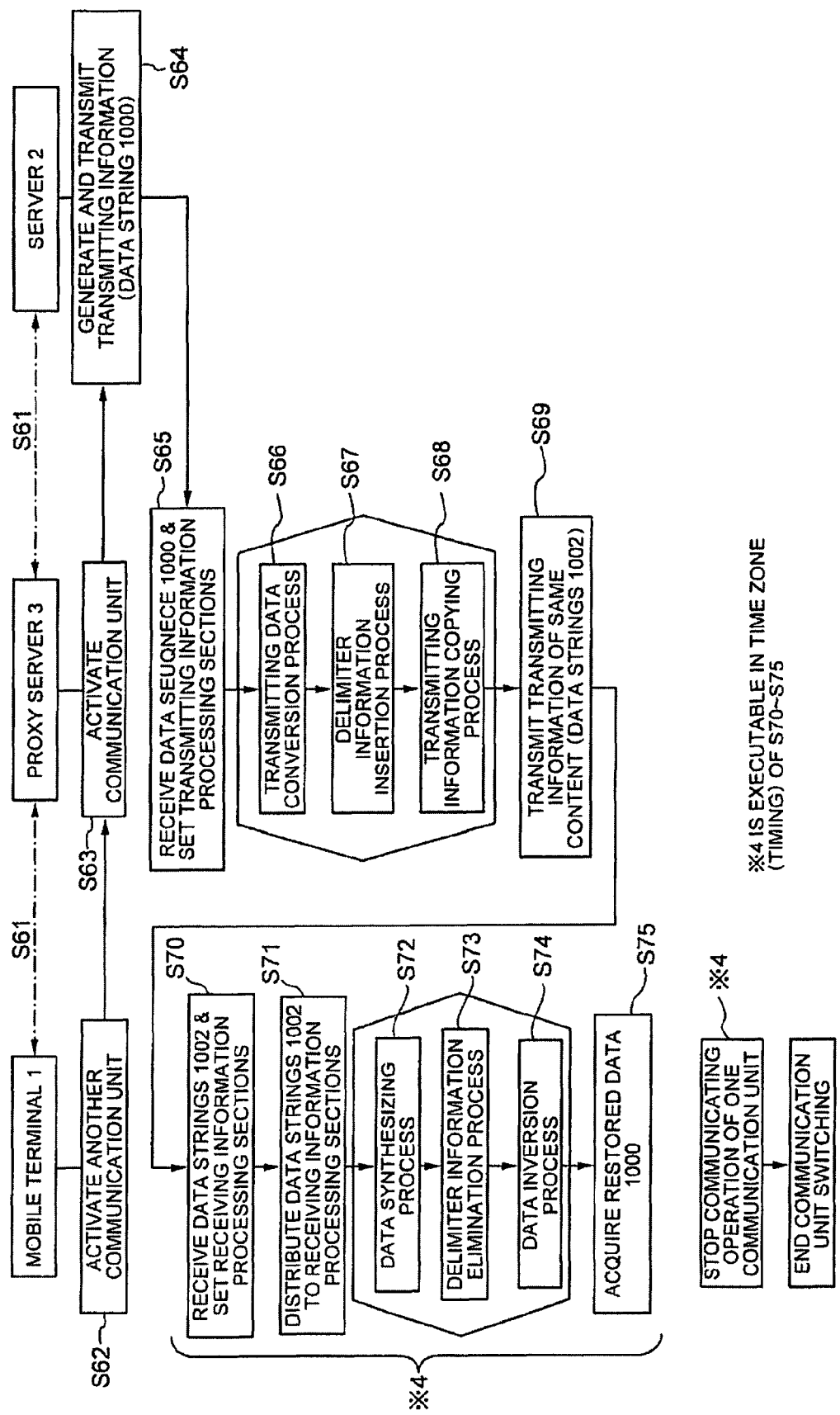

COMMUNICATION SERVICE CONTINUATION SYSTEM, COMMUNICATION SERVICE CONTINUATION METHOD, AND PROGRAM THEREOF

CROSS-REFERENCE TO RELATED APPLICATIONS

This application is based upon and claims the benefit of priority from Japanese patent application No. 2006-300822, filed on Nov. 6, 2006, the disclosure of which is incorporated herein in its entirety by reference.

BACKGROUND OF THE INVENTION

1. Field of the Invention

The present invention relates to a communication service continuation system. In particular, the present invention relates to a communication service continuation system which enables to select and switch communication unit for using communication services corresponding to the situation, and also relates to a communication service continuation method and a program thereof.

2. Related Art

In information and telecommunication services, communication networks are constructed corresponding to the characteristics of terminals and service contents respectively, including fixed-line telephone networks for fixed-line telephones, mobile communication networks (W-CDMA, PDCP, GPRS, etc.) for mobile telephones, and data communication networks (IEEE802.11 for wireless LAN, ADSL, ISDN, etc.) for data communications performed by computers.

In recent years, as computers become smaller and have higher performance, various kinds of terminals are available. Further, as networks become broadband, audio and visual data having large amount of information can be transmitted through data communication networks such as IP.

With such changes in the information technology and the communication technology, boundaries between fixed telephone networks, mobile communication networks and data communication networks become blurred in their structures. Therefore, needs for terminals including various kinds of communication unit increase among general users, so that needs for communication services which can be used beyond the boundaries of communication networks also increase.

In a wireless communication system, a method of preventing loss of communication data at a time of handover in which base stations are switched has been well known generally, an example of which is disclosed in Japanese Patent Application Laid-Open No. 2003-153327 (Patent Document 1).

However, the art in Patent Document 1 is limited to performing handover in a mobile communication network, so it cannot be applied as a method for switching a communication network itself to be used.

In the example described above, in the case where communication unit and communication networks are switched while executing a communication service in a mobile terminal including a plurality of communication unit, the communication service being executed must be stopped for a while and a communicating connection must be established with another communication unit to be used. This causes a problem that communication unit cannot be switched while maintaining execution of the communication service.

Further, in the example described above, in the case where a communication unit is switched to another one while maintaining the executing state of the communication service utilizing a communicating connection with the communication unit, a problem that a loss or delay of communication data is unavoidable is caused.

Specifically, if a user of a mobile terminal using a communication service through a mobile telephone network becomes able to connect with a wireless LAN in an office for example on which larger capacity communication can be performed at higher speed, or if a user using a communication service through an optical fiber network on a LAN in the office wants to continuously use the communication service through a mobile telephone network outside the company, it has been practically impossible to switch communication unit while maintaining the execution of the communication service being used because a loss of data mentioned above cannot be avoidable.

SUMMARY OF THE INVENTION

It is an exemplary object of the present invention to provide a communication service continuation system which allows a user of a mobile terminal including a plurality of communication unit to select and shift communication unit corresponding to the situation during execution of a communication service without causing a loss or delay of data in the communication service.

In order to achieve the object, a communication service continuation system according to an exemplary aspect of the invention includes: a server which provides a communication service; and a mobile terminal connected with the server via communication networks provided in parallel. The mobile terminal includes a transmitting information processor having a copied information transmitting function to, while maintaining a communicating state with the server using one communication network, activate another communication network, and to copy transmitting information to be transmitted to the server to thereby transmit pieces of information having the same content through the one communication network and the other communication network. The transmitting information processor has a communication network switching function to switch the one communication network being used to the other communication network while maintaining the communicating state with the server.

Thereby, during execution of communication services such as a client application and when transmitting data to the server, communication networks and communication units can be switched in the mobile terminal without ending or interrupting the communication service being executed, and the user can continuously use the communication service being executed. Therefore, the user of the mobile terminal can select and switch to the best communication unit corresponding to the situation while continuing execution of the communication service.

Further, a communication service continuation method according to another exemplary aspect of the invention is for switching one communication network being used to another communication network in a mobile terminal when communications are performed between the mobile terminal and a server through communication networks provided in parallel. The method includes: a parallel communication step in which when communications are being performed through the one communication network in the mobile terminal, the other communication network is activated in parallel with the one communication network; a copied information transmitting step in which pieces of information having the same content are generated by copying in the mobile terminal, and the pieces of information are transmitted from the mobile terminal through the one communication network and the other communication network; and a communication limiting step in which the communicating state of the one communication network, of the one communication network and the other communication network being operated in parallel in the mobile terminal, is stopped.

Further, a communication service continuation program according to still another exemplary aspect of the invention is for switching one communication network being used to another communication network in a mobile terminal when communications are performed between the mobile terminal and a server through communication networks provided in parallel. The program causes a computer to perform: a parallel communicating function to, while maintaining a communicating state using one communication network, activate another communication network; a copied information transmitting function to copy transmitting information to be transmitted to the server and to transmit pieces of information having the same content through the one communication network and the other communication network in parallel; and a communication limiting function to stop communications performed through the one communication network, of the one communication network and the other communication network being used, after the copied information transmitting function is performed.

Thereby, it is possible to switch communication units to be used at the best timing for preventing a loss of communication information in the communication service being executed, while continuing execution of the communication service, in the mobile terminal.

Effects of the Invention

As an exemplary advantage according to the invention, in a mobile terminal connected with a server via communication networks provided in parallel, a communication network to be used can be selected and switched without causing a loss of communication data or delay in transmitting information, while maintaining execution of the communication service provided by the server.

BRIEF DESCRIPTION OF THE DRAWINGS

FIG. 3 illustrates exemplary processes performed to data strings in the transmitting information processing section and the receiving information processing section disclosed in FIGS. 2A and 2B;

FIG. 4 illustrates exemplary configurations of the data delimiter information field disclosed in FIG. 3;

FIG. 7 is an overall schematic view showing the entire network to which a communication service continuation system according to a second exemplary embodiment of the present invention is applied;

FIGS. 8A, 8B and 8C are block diagrams showing functional configurations of the communication service continuation system according to the second exemplary embodiment;

FIG. 11 is a flowchart showing a description of operation (2) of the overall communication service continuation system according to the second exemplary embodiment.

Exemplary Embodiments

First Exemplary Embodiment

Hereinafter, a first exemplary embodiment of the present invention will be described based on the accompanying drawings.

Figure 1:
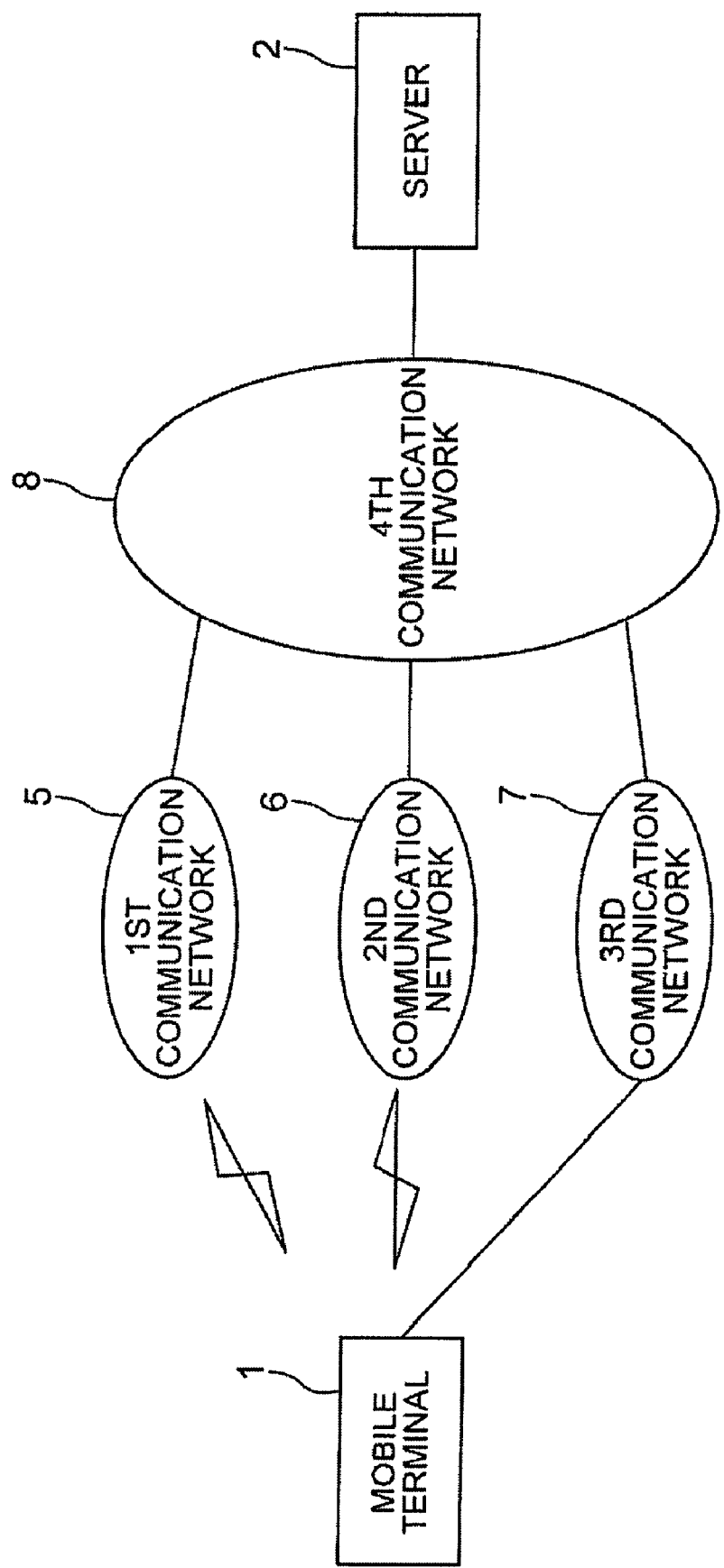
FIG. 1 is an overall schematic view showing the entire network to which a communication service continuation system according to a first exemplary embodiment of the present invention is applied.

FIG. 1 shows an overall configuration of a communication service continuation system according to the exemplary embodiment.

The communication service continuation system shown in FIG. 1 includes: a mobile terminal 1 held by a user; a first communication network (hereinafter referred to as a "communication network") 5, a second communication network (hereinafter referred to as a "communication network") 6, and a third communication network (hereinafter referred to as a "communication network") 7, which are connectable with the mobile terminal 1 and provided in parallel; and a fourth communication network (hereinafter referred to as a "public network") 8 to which all of the three communication networks above described are to be connected. The public network 8 has a server 2 which provides a communication service to the mobile terminal 1.

Figure 2B:
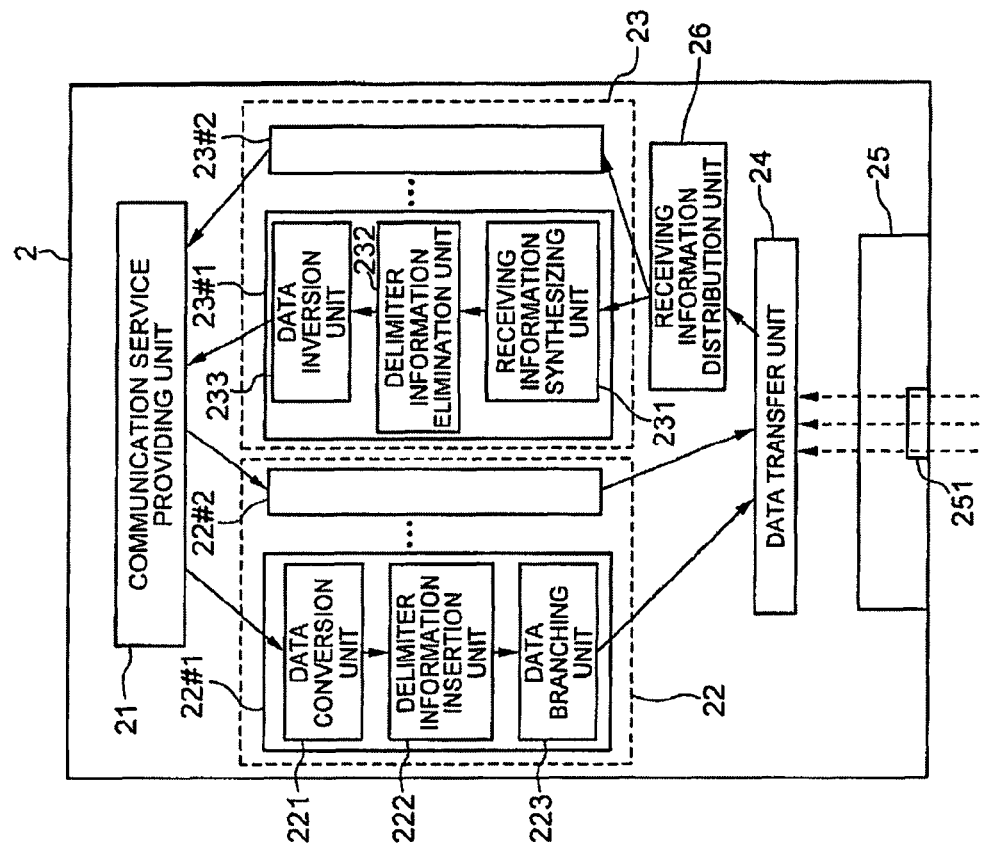
FIGS. 2A and 2B are block diagrams showing functional configurations of the communication service continuation system according to the first exemplary embodiment shown in FIG. 1.
Figure 2A:
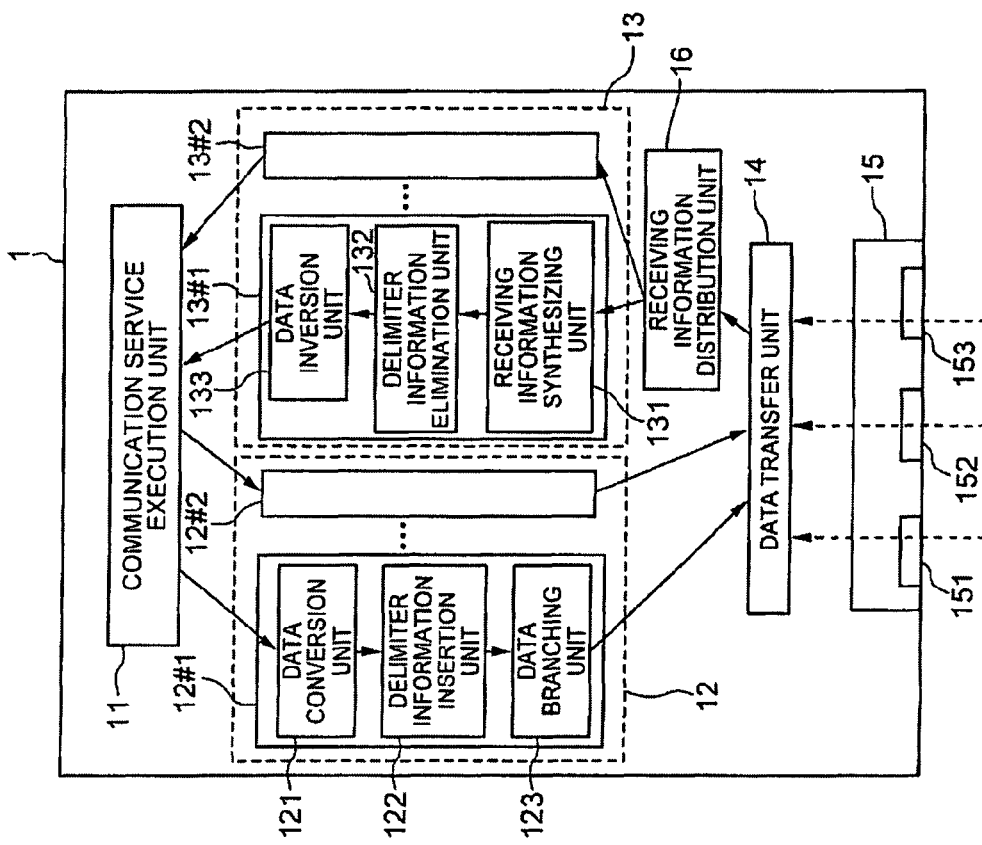

As shown in FIG. 2A, the mobile terminal 1 includes a communication section 15 which directly connects with three communication networks (communication networks 5, 6 and 7) provided in parallel between the server 2 and the mobile terminal 1, and a data transfer unit 14 which transmits and receives information necessary for executing the communication service via the communication section 15.

The mobile terminal 1 also includes a communication service execution unit 11 which executes communication services provided by the server 2 using transmitting and receiving information performed with the server 2 via the communication section 15.

Further, the mobile terminal 1 includes a transmitting information processor 12 which performs a copying process with respect to transmitting information to be transmitted from the communication service execution unit 11 to the server 2, and a receiving information processor 13 which performs a synthesizing and restoring process with respect to receiving information transmitted from the server 2. The mobile terminal 1 is configured such that the transmitting information processor 12 and the receiving information processor 13 are provided together between the data transfer unit 14 and the communication service execution unit 11.

It is noted that the copying process performed to the transmitting information by the transmitting information processor 12 and the synthesizing and restoring process performed to the receiving information by the receiving information processor 13, which are performed in the mobile terminal 1, are required processes to continue a state of executing the communication service provided through communications with the server 2 so as to perform an operation to switch the communication network to be used without causing a loss of transmitting and receiving data. These processes will be described in detail later.

Further, the mobile terminal 1 includes a receiving information distribution unit 16 which distributes receiving information received by the data transfer unit 14 to the receiving information processor 13. The receiving information distribution unit 16 is provided together with the data transfer unit 14.

As shown in FIG. 2B, the server 2 includes a communication section 25 which connects with the public network 8 to transmit and receive information necessary for executing the communication service, and a data transfer unit 24 which performs operations of transmitting and receiving data via the communication section 25.

Further, the server 2 also includes a communication service providing unit 21 which provides a communication service to the mobile terminal 1 by performing communications with the mobile terminal 1 via the communication section 25, a transmitting information processor 22 which performs a copying process with respect to transmitting information to be transmitted by the communication service providing unit 21 to the mobile terminal 1, and a receiving information processor 23 which performs a synthesizing and restoring process with respect to receiving information transmitted from the mobile terminal 1. The server 2 is configured such that the transmitting information processor 22 and the receiving information processor 23 are provided between the data transfer unit 24 and the communication service providing unit 21.

It is noted that the copying process performed to the transmitting information by the transmitting information processor 22 and the synthesizing and restoring process performed to the receiving information by the receiving information processor 23, performed in the server 2, are processes required to continue a state of executing the communication service provided through communications with the server 2 so as to perform an operation to switch the communication network to be used without a loss of transmitting and receiving data in the mobile terminal 1. These processes will be described in detail later.

Further, the server 2 includes a receiving information distribution unit 26 which distributes receiving information received by the data transfer unit 24 to the receiving information processor 23. The receiving information distributing unit 26 is provided together with the data transfer unit 24.

Next, the respective components of the system will be described in detail.

The communication service execution unit 11 provided in the mobile terminal 1 performs communications with the communication service providing unit 21 in the server 2 and executes a communication service provided by the server 2, and has a transmitting information generating function to generate transmitting information to be transmitted to the server 2 when executing the service.

[Mobile terminal 1]

The transmitting information processor 12 includes one or more transmitting information processing sections (12#1, 12#2, . . . ). Each of the transmitting information processing sections performs a copying process to each piece of the transmitting information generated to thereby generate pieces of transmitting information having the same content, and processes the information to be in a form which can be synthesized and restored by the receiving information processor 23 of the server 2 which is the receiving side of the information.

Further, each of the transmitting information processing sections (12#1, 12#2, . . . ) copies the transmitting information corresponding to the number of communication networks being used among the communication networks with which the mobile terminal 1 connects. For example, if two communication networks are used in parallel, another piece of transmitting information is generated by copying, and if three communication networks are used in parallel, two other pieces of transmitting information are generated by copying.

Thereby, pieces of transmitting information having the same content can be transmitted through the communication networks being used, respectively.

Further, the communication service execution unit 11 has a transmitting information processing unit setting function to set transmitting information processing sections (12#1, 12#2, 12#3, . . . ) within the transmitting information processor 12, corresponding to the pieces of transmitting information generated. Each of the transmitting information processing sections (12#1, 12#2, 12#3, . . . ) performs a copying process to the transmitting information corresponding thereto.

Note that the transmitting information processor 12 may be configured to include one or more transmitting information processing sections previously set.

Thereby, since a plurality of transmitting information processing sections (12#1, 12#2, 12#3, . . . ) can perform copying and processing in parallel with respect to multiple pieces of transmitting information generated by the communication service execution unit 11, it is possible to speed up the communication process.

The transmitting information processing section 12#1 in the mobile terminal 1 includes a data conversion unit 121 which is a processing unit with respect to transmitting information generated by the communication service execution unit 11, a delimiter information insertion unit 122, and a transmitting data branching unit 123.

The functions of the data conversion unit 121 and the delimiter information insertion unit 122 of the transmitting information processing section 12#1 that processes the transmitting information to be in a form capable of being synthesized and restored, and the function of the transmission data branching unit 123 that performs a copying process to the processed transmitting information, provided in the server 2 which is the receiving side of the transmitting information, will be described in detail later.

It is noted that each of the transmitting information processing sections 12#2, 12#3 . . . set corresponding to the respective pieces of the transmitting information by the communication service execution unit 11 has the same configuration.

The receiving information processor 13 includes one or more receiving information processing sections 13#1, 13#2, . . . which performs a synthesizing and restoring process to pieces of receiving information of different contents transmitted from the server 2. Each of the receiving information processing sections (13#1, 13#2 . . . ) has a synthesizing and restoring function to perform a synthesizing process to the pieces of receiving information having the same content transmitted from the server 2 through different communication networks, to thereby restore a set of original information from the pieces of receiving information. The restored information is forwarded to the communication service execution unit 11, and the communication service is executed using the information.

Thereby, in the mobile terminal 1, a plurality of receiving information processing sections (13#1, 13#2, 13#3, . . . ) can perform a synthesis and restoring process in parallel to multiple pieces of receiving information of different contents, so it is possible to speed up the communication processing.

Further, the receiving information processing sections (13#1, 13#2, 13#3, . . . ) configuring the receiving information processor 13 are set corresponding to pieces of receiving information of different contents by the data transfer unit 14 as described later, and each receiving information processing section performs a synthesizing and restoring process to the corresponding receiving information.

It is noted that the receiving information processor 13 may be configured to include one or more receiving information processing sections previously set.

Even with this configuration, a plurality of receiving information processing sections (13#1, 13#2, 13#3, . . . ) can perform a synthesizing and restoring process in parallel corresponding to multiple pieces of receiving information transmitted from the server 2. Therefore, it is possible to speed up the communication process of the entire system.

The receiving information processing section 13#1 in the mobile terminal 1 is configured to include components which synthesizes and processes pieces of receiving information of the same content distributed by the data distribution unit 16. Namely, the receiving information processing section 13#1 includes a receiving information synthesizing unit 131, a delimiter information elimination unit 132, and a receiving data inversion unit 133, which are units for processing the receiving information.

A processing and copying process performed by each of the receiving information synthesizing unit 131, the delimiter information elimination unit 132, and the reception data inversion unit 133, which are units for processing the receiving information, will be described in detail later.

Each of the receiving information processing sections 13#2, 13#3 . . . , set corresponding to each piece of the receiving information, also has the same configuration.

The data transfer unit 14 has a transmission and reception performing function to perform transmission and reception of data with the server 2 as described above, a communication unit activating function to set the communication units 151 to 153 in the communication section 15 to be in an activated state to thereby connect with the corresponding communication networks 5 to 7 so as to be able to communicate with the server 2, a distributing and transmitting function to distribute multiple pieces of transmitting information of the same content copied by the transmitting information processing section 12#1 to communication units set in an activated state and transmit to the server 2 in parallel, and a receiving information processing section setting function to set receiving information processing sections 13#1, 13#2, . . . which perform a synthesizing and restoring process to the receiving information transmitted from the server 2 as described above.

As shown in FIG. 2A, the communication section 15 in the mobile terminal 1 is configured to include a first data communication unit (hereinafter referred to as a "communication unit") 151 corresponding to the first communication network 5, a second data communication unit (hereinafter referred to as a "communication unit") 152 corresponding to the second communication network 6, and a third data communication unit (hereinafter referred to as a "communication unit") 153 corresponding to the third communication network 7.

The communication units 151 to 153 configuring the communication section 15 actually provide data communication functions through wired and wireless communication networks. Specifically, they are network interfaces for mobile communications such as W-CDMA and PDC packets, wireless LAN such as IEEE802.22, and ADSL and ISDN.

The receiving information distribution unit 16 in the mobile terminal 1 has a receiving information distributing function to receive receiving information received by the data transfer unit 14 and determine how to handle while referring to session identification information, described later, included in the receiving information to thereby distribute the information to the receiving information processing sections 13#1, 13#2, . . . previously set.

(Server 2)

The communication service providing unit 21 in the server 2 performs communications with the communication service execution unit 11 in the mobile terminal 1, and provides a required communication service to the mobile terminal 1.

Further, the communication service providing unit 21 has a transmitting information generating function to generate transmitting information to be transmitted to the mobile terminal 1, and a transmitting information processing section setting function to set transmitting information processing sections (22#1, 22#2, . . . ) which perform a copying process to the transmitting information corresponding to the transmitting information, in the transmitting information processor 22.

The transmitting information processor 22 in the server 2 includes one or more transmitting information processing sections (22#1, 22#2, . . . ). Each of the transmitting information processing sections copies the generated transmitting information to thereby generate pieces of transmitting information having the same content, and processes the information to be in a form capable of being synthesized and reproduced in the receiving information processor 13 in the mobile terminal 1 which is the receiving side of the information.

Further, the transmitting information processing sections (22#1, 22#2 . . . ) copy the transmitting information corresponding to the number of communication networks being used among the communication networks with which the mobile terminal 1 connects. For example, if two communication networks are used in parallel, one copy of the transmitting information will be generated additionally, and when three communication networks are used in parallel, two copies of the transmitting information will be generated additionally.

Thereby, the pieces of transmitting information having the same content can be transmitted through the respective communication networks being used.

Further, as described above, the communication service execution unit 21 has the transmitting information processing unit setting function to set the transmitting information processing sections (22#1, 22#2, 22#3, . . . ) inside the transmitting information processor 22 corresponding to the transmitting information generated, and each of the transmitting information processing sections (22#1, 22#2, 22#3, . . . ) performs a copying process to the transmitting information correlated thereto.

It is noted that the transmitting information processing device 22 may be configured to include one or more transmitting information processing sections previously set.

Thereby, in the server 2, since a plurality of transmitting information processing sections (23#1, 23#2, 23#3, . . . ) can perform a synthesizing and restoring process to multiple pieces of transmitting information having different contents in parallel, it is possible to speed up the communication process.

Further, the transmitting information processing section 22#1 is configured to include a data conversion unit 221, a delimiter information insertion unit 222 and a transmission data branching unit 223, which are units to process transmitting information received from the communication service execution unit 21.

The functions of the data conversion unit 221 and the delimiter information insertion unit 222 of the transmitting information processing section 22#1 which processes the transmitting information into a form capable of being synthesized and restored in the mobile terminal 1 which is the receiving side of the transmitting information, and the function of the transmission data branching unit 223 which performs a copying process to the processed transmitting information, will be described in detail later.

It is noted that the transmitting information processing sections 22#2, 22#3, . . . , which are set corresponding to respective pieces of transmitting information by the communication service execution unit 21, also have the same configuration.

The data transfer unit 24 in the server 2 has a transmission and reception executing function to execute transmitting and receiving operations of data with the mobile terminal 1 as described above, and a distributing and transmitting function to transmit multiple pieces of transmitting information of the same content including the information copied by the transmitting information processing section 22#1 to the mobile terminal 1 through the communication networks 5 to 7 which have been activated in advance.

Further, the data transfer unit 24 has a receiving information processing section setting function to set receiving information processing sections 23#1, 23#2, . . . which perform a synthesizing and restoring process to the receiving information transmitted from the mobile terminal 1 as described above.

As shown in FIG. 2B, the communication section 25 includes the communication unit 251 corresponding to the public network 8, and is actually a network interface for connecting to the Internet which is a public network.

The receiving information distribution unit 26 has a receiving information distributing function to receive receiving information received by the data transfer unit 24 and determines the correspondence by referring to session identification information, described later, included in the receiving information to thereby distribute the information to the receiving information processing sections 23#1, 23#2, . . . previously set.

[Components of Mobile Terminal 1]

Next, the data conversion unit 121, the delimiter information insertion unit 122 and the transmission data branching unit 123, configuring the transmitting information processing section 12#1 provided in the transmitting information processor 12 of the mobile terminal 1, will be described in detail. It is noted that the transmitting information processing sections 12#2, 12#3, . . . also have the same configuration.

The data conversion unit 121 in the transmission data processing section 12#1 has a data conversion function to receive transmitting information generated by the communication service execution unit 11, which is to be transmitted from the mobile terminal 1 to the server 2, from the communication service execution unit 11, to set a location for inserting delimiter information, and to convert a specific data portion of the transmitting information.

Now, the data conversion function of the data conversion unit 121 will be described in detail with reference to FIG. 3.

Specifically, if a predetermined sequence (hereinafter referred to as an "escape sequence") exists in the transmitting information (data string 1000) forwarded from the communication service execution unit 11, the data conversion unit 121 inserts the same escape sequence before it to thereby set continuous escape sequences. Then, the data conversion unit 121 replaces the latter escape sequence with another predetermined sequence (hereinafter referred to as a "replacing escape sequence").

FIG. 3 shows an example of a data conversion process. To the data string 1000 including an escape sequence forwarded from the communication service execution unit 11, the data conversion unit 121 inserts the same escape sequence before the escape sequence, and replaces the latter escape sequence with a replacing escape sequence, whereby the data string 1000 is converted into a data string 1001.

The delimiter information insertion unit 122 performs processing to insert delimiter information for each data length, which is previously set, to the transmitting information (data string 1001) forwarded from the data conversion unit.

FIG. 3 shows an example of a delimiter information insertion process. To the data string 1001 forwarded from the data conversion unit 121, the delimiter information insertion unit 122 performs a delimiter information insertion process to insert data delimiter information between data $D_1$ and data $D_2$, between data $D_x$ and $D_{x+1}$, between data $D_y$ and $D_{y+1}$, and between data $D_z$ and $D_{z+1}$, respectively, whereby the data string 1001 is converted into a data string 1002.

Now, the configuration of the delimiter information will be described in detail.

The delimiter information includes session identification information and data sequence information.

The session identification information is a unique identifier which corresponds to transmitting information and receiving information (hereinafter referred to as a "data string") executed between the mobile terminal 1 and the server 2. As to a session, a period from the time that the communication service execution unit 11 of the originator or the communication service providing unit 21 generates transmitting information (data string 1000), to the time that the data string is transmitted and the communication service providing unit 21 or the communication service execution unit 11 receives the data string, s set to be a unit.

In other words, even if plural pieces of data are transmitted and received between the mobile terminal 1 and the server 2, corresponding relationships between the transmitting information processing unit and the receiving information processing unit that process the respective pieces of data can be identified by referring to the session identification information.

FIG. 4 shows an exemplary configuration of delimiter information to be inserted into the transmitting information.

The delimiter information of the exemplary configuration 1 shown in FIG. 4 includes, following the two continuous escape sequences at the top of the information field which is the content part of the transmitting information, session identification information and data sequence information, each of which has a fixed length. In this case, since the data conversion unit 121 has performed a conversion process to the data string, the top of the delimiter information can be identified from the two continuous escape sequences.

Further, as shown in an exemplary configuration 2, data sequence information may have a variable length and end with two continuous escape sequences. Alternatively, as shown in an exemplary configuration 3, session identification information may also have a variable length and end with two continuous escape sequences.

In the case where the information field is set to have a variable length and end with two continuous escape sequences, it is necessary to determine whether the same sequence as the escape sequence exists in the information field, and if there is the sane sequence, another data conversion process is required.

The transmission data branching unit 123 has a transmitting information copying function to copy the transmitting information (data string 1002) forwarded from the delimiter information insertion unit 122 by the number corresponding to the communication units 151 to 153 being operated.

For instance, if two communication units among the communication units 151 to 153 are being operated, one copy of the data string 1002 is generated, and if all of the three communication units are being operated, two copies of the data string 1002 are generated.

Next, the receiving information synthesizing function of the receiving information processor 13 in the mobile terminal 1 will be described In detail.

The receiving information synthesizing unit 131 of the receiving information processing section 13#1 in the receiving information processor 13 has a receiving information arranging function to receive receiving information (data string 1002) transmitted from the server 2, and to rearrange the sequence of the data string 1002, which is fragmented, in order.

Further, the receiving information synthesizing unit 131 has a data position calculating function to calculate the latest position of the received data in accordance with the sequence number information which is a component of the delimiter information in the receiving information, and to record the data position.

The data position to be calculated means an indication of a data length (hereinafter referred to as an offset value) from the sequence number to the latest data received.

Further, the receiving information synthesizing unit 131 has a duplicate information eliminating function to discard data same as information older than the latest data position recorded, that is, if the unit receives the data previously received from the receiving information distributing unit 16, the unit discard it.

Thereby, when information including a data position which is newer than the recorded data position, the record of the data position is updated, and the receiving information is forwarded to the delimiter information elimination unit 132 to thereby synthesize the data string (data string 1002).

Further, irrespective of a difference in line speed and line conditions of communication networks used in parallel for communications (for example, communication conditions of the communication networks 5 and 6 in this case), the synthesizing process can be performed from the pieces of receiving information having the same content without causing a loss of data.

The delimiter information elimination unit 132 has a delimiter information eliminating function to temporarily store the synthesized receiving information forwarded from the receiving information synthesizing unit 131 and to delete the delimiter information from the receiving information.

Specifically, the delimiter information elimination unit 132 performs a delimiter information elimination process to the data string 1002 which is forwarded from the information synthesis unit 131 and synthesized, and converts the data string 1002 into the data string 1001 by eliminating the inserted delimiter information in the server 2.

FIG. 3 shows an example of a delimiter information elimination process. A delimiter information elimination process is performed to the receiving information (data string 1002) forwarded from the receiving information synthesizing unit 131, whereby the data string 1001 is restored in which delimiter information fields existed between data $D_1$ and data $D_2$, between data $D_x$ and data $D_{x1}$, between data $D_y$ and $D_{y+1}$, and between data $D_z$ and $Dz+_1$, respectively, are eliminated.

The data inversion unit 133 has a data inverting function to perform a restoring process to a data part, of the receiving information, converted by the transmitting information processor 22 of the server 2.

Specifically, the data inversion unit 133 performs a data inversion process to the data string 1001 forwarded from the delimiter information elimination unit 132 so as to restore the data part, converted by the data conversion process performed by the data conversion unit 221 in the server 2, to the original.

FIG. 3 shows an example of a data restoring process. The data inversion unit 133 performs a data inversion process, to the continuing escape sequence and replacing escape sequence in the data string 1001 forwarded from the delimiter information elimination unit 132, to delete the escape sequence and replace the replacing escape sequence with an escape sequence to thereby restore the data string 1000.

[Components of Server 2]

The data conversion unit 221, the delimiter information insertion unit 222, and the transmitting data branching unit 223, included in the transmitting information processing section 22#1 in the transmitting information processor 22 of the server 2, will be described in detail. It is noted that the transmitting information processing sections 22#2, 22#3, . . . also have the same configuration.

The data conversion unit 221 provided in the transmitting information processing section 22#1 has a data converting function to receive transmitting information, generated by the communication service providing unit 21 and to be transmitted from the server 2 to the mobile terminal 1, from the communication service providing unit 21, to set an insertion part of the delimiter information, and to perform a conversion process to a specific data part of the transmitting information.

It is noted that the data converting function of the data conversion unit 221 is the same as that of the data conversion unit 121, and the data conversion unit 221 converts the data string 1000 into the data string 1001 as shown in FIG. 3.

The delimiter information insertion unit 222 performs, to the transmitting information (data string 1001) forwarded from the data conversion unit 221, a process to insert delimiter information for each data length previously set in the same manner as the delimiter information insertion unit 122.

Also in this delimiter information insertion process, the delimiter information insertion unit 222 performs a delimiter information insertion process to insert delimiter information between data $D_1$ and data $D_2$, between data D, and data $D_{x+1}$, between data $D_y$ and data $D_{y+1}$, and between data $D_z$ and data $D_{z+1}$, respectively, to the data string 1001 forwarded from the data conversion unit 221, to thereby convert the data string 1001 into the data string 1002 as shown in FIG. 3, in the similar manner as the delimiter information insertion unit 122.

The transmission data branching unit 223 has a transmitting information copying function to copy the transmitting information (data string 1002) forwarded from the delimiter information insertion unit 222 so as to have a number of copies corresponding to the communication networks 5 to 7 being operated.

For example, if two communication networks among the communication networks 5 to 7 are being operated, one copy of the data string 1002 is generated, and if all of the three communication networks are being operated, two copies of the data strings are generated.

Next, the receiving information synthesizing function of the receiving information processor 23 in the server 2 5 will be described in detail.

The receiving information synthesizing unit 231 of the receiving information processing section 23#1 in the receiving information processor 23 has: a receiving information arranging function to receive the receiving information (data string 1002) transmitted from the mobile terminal 1, and to rearrange the sequence of the data string 1002, which is transmitted while being fragmented, in order; and a data position calculating function to calculate the latest data position received in accordance with the sequence number information which is a component of the delimiter information in the receiving Information, and to record the data position.

Further, the receiving information synthesizing unit 231 has a duplicate information eliminating function to, when it receives the same data as information older than the recorded latest data position, that is, if the unit receives data which has been received, the unit discards the data.

Thereby, when the receiving information synthesizing unit 231 receives information including a data position which is newer than the recorded data position, the unit updates the record of the data position, and forwards the receiving information to the delimiter information elimination unit 232 to thereby synthesize the data string (data string 1002).

Further, regardless of the line speeds of the communication networks used for communications (for example, the communicating states in the communication networks 5 and 6 in this case), the synthesizing process can be performed from the pieces of transmitted information having the same content without causing a loss of data.

The delimiter information elimination unit 232 has a delimiter information eliminating function to temporarily store the synthesized receiving information forwarded from the receiving information synthesizing unit 231, and to delete the delimiter information from the receiving information.

Specifically, the delimiter information elimination unit 232 performs a delimiter information elimination process with respect to the data string 1002 forwarded from and synthesized by the information synthesizing unit 231, and eliminates the delimiter information inserted in the mobile terminal 1 to thereby convert the data string 1002 into the data string 1001, in the same manner as the delimiter information elimination unit 132.

FIG. 3 shows an example of a delimiter information elimination process. By performing the delimiter information elimination process to the receiving information (data string 1002) forwarded from the receiving information synthesizing unit 231, the data string 1001 is restored in which the delimiter information fields existed between the data $D_1$ and $D_2$, between the data $D_x$ and $D_{x+1}$, between the data $D_y$ and $D_{y+1}$, and between the data $D_z$ and $D_{z+1}$, respectively, are eliminated.

The data inversion unit 233 has a data inverting function to perform a restoration and conversion process to the data part converted by the transmitting information processor 12 of the mobile terminal 1 in the receiving information.

Specifically, the data inversion unit 233 performs a data inversion process to the data string 1001 forwarded from the delimiter information elimination unit 232 to restore the data part converted in the data conversion process performed by the data conversion unit 121 in the mobile terminal 1.

FIG. 3 shows an example of a data restoration and conversion process. The data inversion unit 233 performs a data inversion process, to the continuing escape sequence and replacing escape sequence in the data string 1001 forwarded from the delimiter information elimination unit 232, to delete the escape sequence and replace the replacing escape sequence with an escape sequence, to thereby restore the data string 1000.

Description of Operation (1) of First Exemplary Embodiment

Next, the overall operation of the above-described system will be explained.

In the communication service continuation system configured as the first exemplary embodiment, when communications are being performed in the mobile terminal 1 through one communication network 5, another communication network 6 is activated in parallel with the one communication network 5 (parallel communication step).

Next, in the mobile terminal 1, information having the same content is generated by copying, and the pieces of information are transmitted to the server 2 through the one and the other communication networks (copied information transmitting step).

Then, the server 2 receives the pieces of information having the same content through the one and the other communication networks, and synthesizes the information to be a set of information (receiving information synthesizing step).

Then, in the mobile terminal 1, the communicating state of the one communication network 5, of the one and the other communication networks which are in the operating state in parallel, is changed to a stopped state (communication limiting step).

The communication limiting step may be set prior to the receiving information synthesizing step.

Thereby, an operation to stop the communicating state of one communication network of the communicating unit and the communication networks being operated in parallel (communication limiting step) can be performed after the copied information transmitting step performed by the mobile terminal 1 to transmit the pieces of information having the same content in parallel to the server 2. Through the communication limiting step, the communication unit is switched.

It is noted that the parallel communication step, the copied information transmitting step, the receiving information synthesizing step and the communication limiting step may be configured such that the executed contents thereof are programmed so as to be performed by a computer.

Thereby, the mobile terminal 1 can switch a communication unit to be used, without interrupting the communication service being executed, at the best timing capable of preventing a loss of communication information in the communication service.

The description of operation explained above will be described in detail.

Among the operations of the communication service continuation system in the first exemplary embodiment, an operation to switch a communication network to be used in the mobile terminal 1, when information according to the communication service being executed is transmitted from the mobile terminal 1 to the server 2, will be described based on the flowchart in FIG. 5.

First, the mobile terminal 1 is executing the communication service provided by the server 2 by performing communications through one communication network 5 among the three communication networks provided in parallel (step Si).

The mobile terminal 1 activates the communication unit 152 while maintaining the communication state of the communication unit 151 being used, to thereby set a state in which communications can be performed through the corresponding communication networks 5 and 6 (step S2).

Then, the communication service execution unit 11 of the mobile terminal 1 generates transmitting information (data string 1000) to be transmitted to the server 2, and sets the transmitting information processing section 12#1 corresponding to the transmitting information (step S3).

Then, the data conversion unit 121 provided in the transmitting information processing section 12#1 receives the data string 1000 from the communication service execution unit 11, and performs a data conversion process to the transmitting information (step S4). Specifically, the data conversion unit 121 performs a process to convert the data string 1000 into the data string 1001 as shown in FIG. 3.

Then, the delimiter information insertion unit 122 provided in the transmitting information processing section 12#1 receives the data string 1001 from the data conversion unit 121, and performs a delimiter information insertion process to the data string 1001 (step S5). Specifically, the delimiter information insertion unit 122 performs a process to convert the data string 1001 into the data string 1002 as shown in FIG. 3.

Then, the data branching unit 123 provided in the transmitting information processing section 12#1 receives the data string 1002 in which the delimiter information is inserted by the delimiter information insertion unit 122, and performs a process to copy the data string 1002. In this step, one copy of the data string 1002, having the same content, is generated corresponding to the two communication units 151 and 152 being used (step S6).

At this time, the data transfer unit 14 separates the two data strings 1002 having the same content for the communication section 151 and for the communication section 152 to thereby transmit the data strings to the server 2 through the communication networks 5 and 6 being operated corresponding thereto, respectively (step S7).

Next, in the server 2, the data transfer unit 24 receives the pieces of receiving information (data strings 1002) having the same content transmitted through the communication networks 5 and 6 and temporarily stores the information, and sets the receiving information processing section 23#1 corresponding to the receiving information (step S8).

Then, the receiving information distribution unit 26 distributes the receiving information (data strings 1002) to the receiving information synthesizing unit 231 provided in the receiving information processing section 23#1 (step S9)

Then, the receiving information synthesizing unit 231 performs a synthesizing process to the receiving information (data string 1002) distributed (step S10).

At this stage, the receiving information synthesizing unit 231 records the latest data position in the received data in accordance with the sequence number which is a component of delimiter information included in the receiving information.

Further, the receiving information synthesizing unit 231 discards the information older than the latest data position recorded, that is, the data which has been received. When receiving information including a new data position, the receiving information synthesis unit 231 updates the record of the latest data position, and forwards the received information to the delimiter information elimination unit 232.

Thereby, it is possible to perform a synthesizing process without causing a loss of data, regardless of a difference between line speeds of the communication networks used for communications (in this case, communication networks 5 and 6) and communicating states.

Then, the delimiter information elimination unit 232 performs a delimiter information elimination process to the synthesized set of data string 1002. Specifically, the delimiter information elimination unit 232 converts the data string 1002 into the data strong 1001 as shown in FIG. 3 (step S11)

Next, the data inversion unit 233 provided in the transmitting information processing section 23#1 receives the data string 1001 from the delimiter information elimination unit 232, and performs a data inversion process to the data string 1001 to thereby convert the data string 1001 into the data string 1000 as shown in FIG. 3 (step S12).

Finally, the communication service providing unit 21 receives the data string 1000, thereby one session in which information is transmitted from the mobile terminal 1 to the server 2 is completed (step S13).

After the step S8 in the description of operation, a communication unit used for executing the communication service can be switched from the one communication unit 151 to the other communication unit 152 by the communication switching operation (see *1 in FIG. 5, communication limiting step) to set the communication unit 151, of the communication units 151 and 152 being used n parallel in the mobile terminal 1, to be in a communication stopped state.

Figure 5:
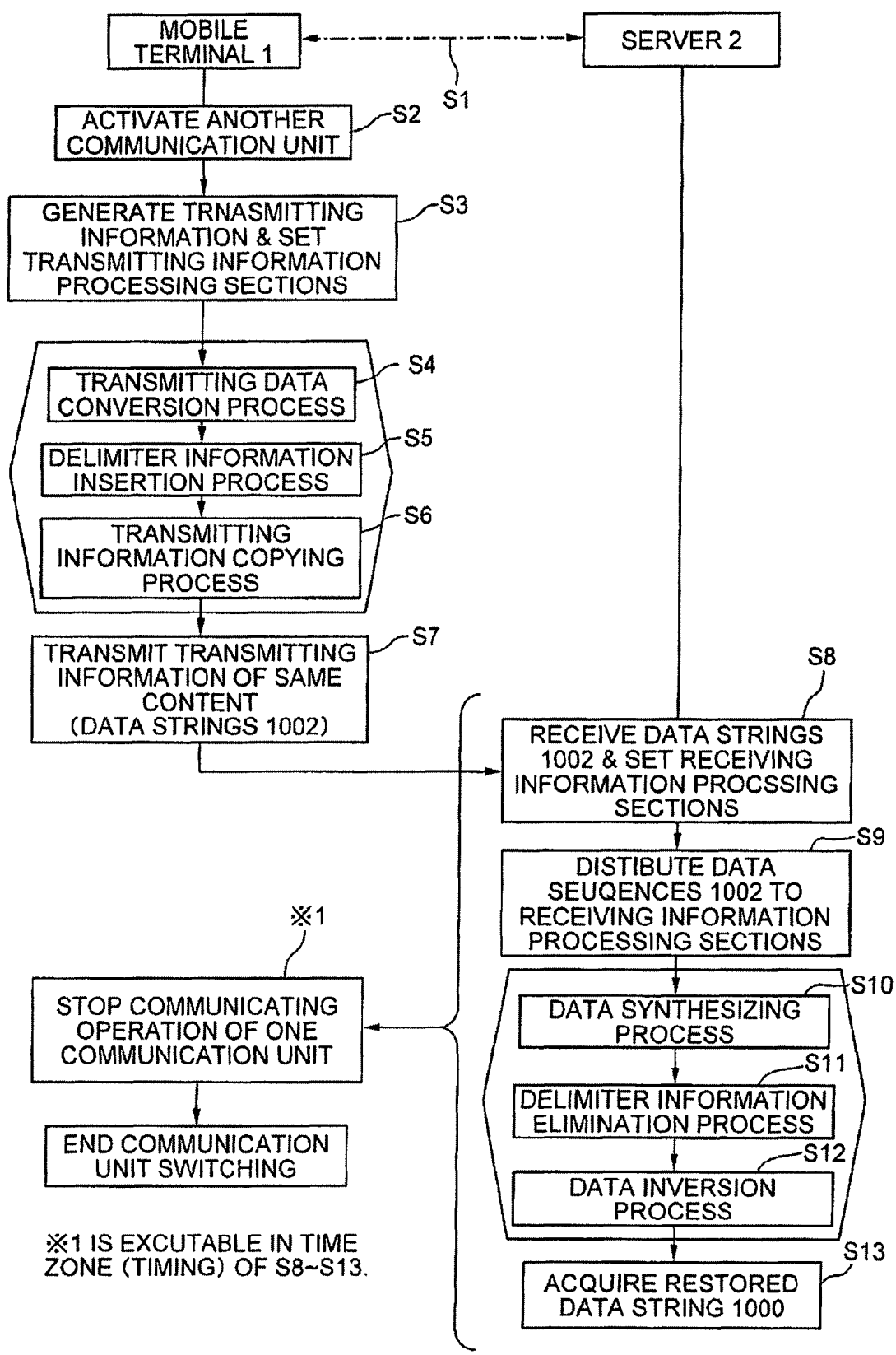
FIG. 5 is a flowchart showing a description of operation (1) of the overall communication service continuation system according to the first exemplary embodiment.

It is noted that the switching operation by the communication unit can be performed at any time in the time zone including the steps S8 to S13 shown in FIG. 5 up to the time that the mobile terminal 1 performs a transmitting or receiving operation in the next session.

Alternatively, the switching operation can be performed after a plurality of communication units are set to be in an operating state in parallel in the mobile terminal 1 (step S2) but in a state that a transmitting or receiving operation has not been performed between the mobile terminal 1 and the server 2, or in a state before starting transmission of the transmitting information.

Further, in the description of operation (1) of the first exemplary embodiment, if the time interval between the copied information transmitting step (step S8) and a timing of performing the switching operation is long, a sufficient time is allowed to receive the pieces of transmitting information having the same content by the server. Therefore, it is possible to prevent a loss of communication information and to perform an operation to switch the communication network more stably.

Description of Operation (2) of First Exemplary Embodiment

Switching of a communication network can be performed similarly in the case where a communication unit switching operation (communication limiting step) is performed in the mobile terminal 1 in a time zone when the mobile terminal 1 performs synthesizing and processing to the receiving information transmitted from the server 2. Next, a description of operation will be given for this case.

In the communication service continuation system configured as the first exemplary embodiment, first, when communications are being performed through the one communication network 5, another communication network 6 is activated in parallel with the one communication network 5 in the mobile terminal 1 (parallel communication step).

Then, in the server 2, a copy of information having the same content is generated, and the pieces of information is transmitted to the mobile terminal 1 through the one and the other communication networks 5 and 6 (copied information transmitting step).

Then, in the mobile terminal 1, the pieces of information having the same content transmitted from the server 2 are received, and are synthesized to be a set of information (receiving information synthesizing step).

When the receiving information synthesizing step is being performed, the communicating state of the one communication network is stopped in the mobile terminal 1 (communication limiting step).

It is noted that the parallel communication step, the copied information transmitting step, the receiving information synthesizing step, and the communication limiting step may be configured such that the executing contents are programmed so as to cause a computer to perform them.

Thereby, the mobile terminal 1 can switch a communication unit to be used, without interrupting the communication service being executed, at the best timing to avoid a loss of communication information in the communication service.

The description of operation given above will be described in more detail.

Figure 6:
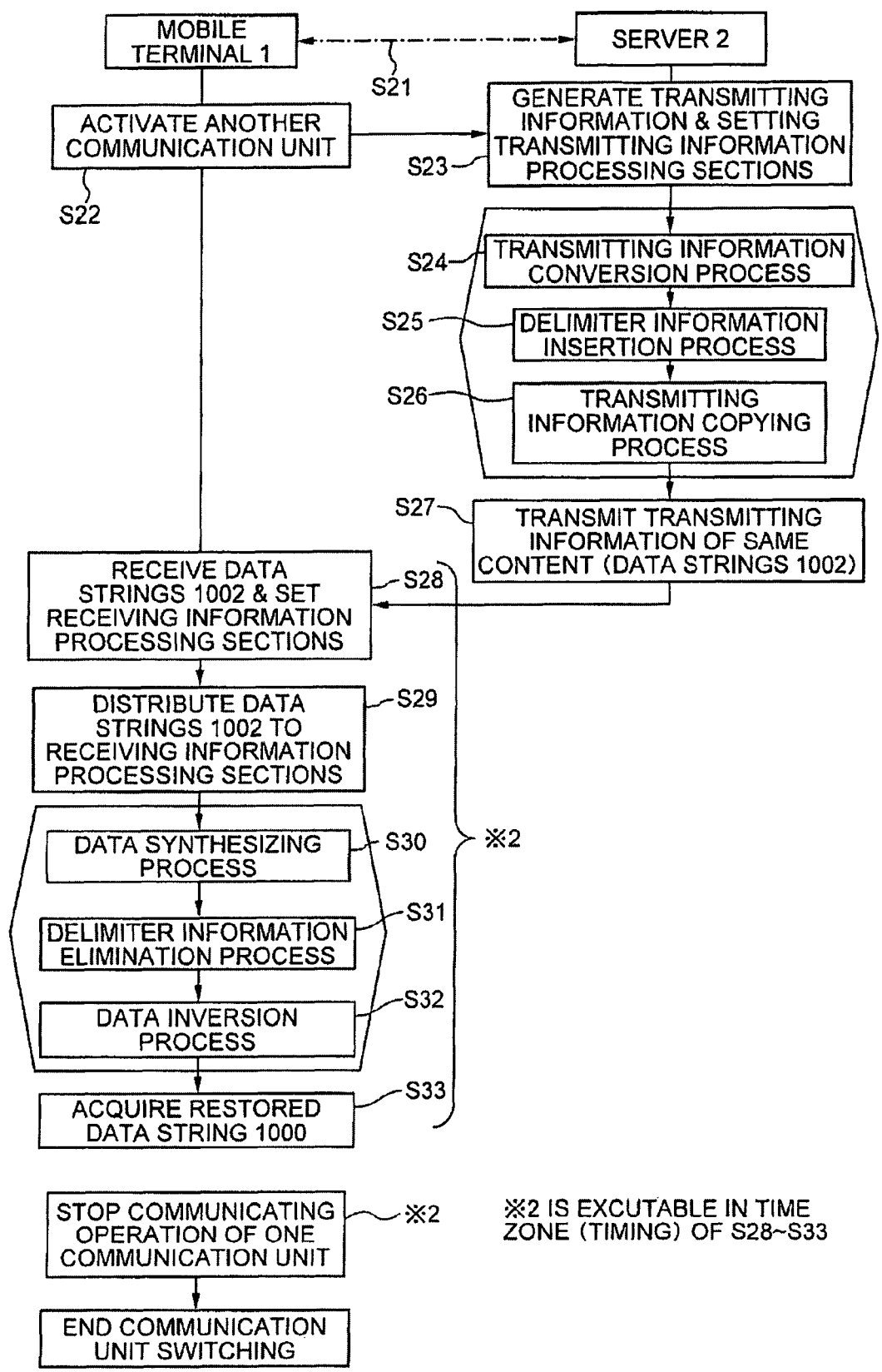
FIG. 6 a flowchart showing a description of operation (2) of the overall communication service continuation system according to the first exemplary embodiment.

Among the operations of the communication service continuation system of the first exemplary embodiment, description will be given for an operation of the system in the case of switching the communication network to be used in the mobile terminal 1 when information of the communication service being executed is transmitted from the server 2 to the mobile terminal 1, based on the flowchart shown in FIG. 6.

The mobile terminal 1 is executing a communication service provided by the server 2 by performing communications through one communication network (communication network 5) among the three communication networks provided in parallel (step S21).

In this state, the mobile terminal 1 activates the communication unit 152 in parallel with the communication unit 151 being used to thereby set a state where parallel communications are executable through the corresponding communication networks 5 and 6 (step S22)

Then, the communication service providing unit 21 in the server 2 generates transmitting information (data string 1000) to be transmitted to the mobile terminal 1, and sets the transmitting information processing section 22#1 corresponding to the transmitting information (step S23).

Then, the data conversion unit 221 provided in the transmitting information processing section 22#1 receives the data string 1000 from the communication service providing unit 21, and performs a data conversion process to the data string 1000 (step S24). Specifically, the data string 1000 shown in FIG. 3 is converted into the data string 1001.

Then, the delimiter information insertion unit 222 provided in the transmitting information processing section 22#1 receives the data string 1001 from the data conversion unit 221, and performs a delimiter information insertion process to the data string 1001 (step S25). Specifically, the data string 1001 shown in FIG. 3 is converted into the data string 1002.

Then, the data branching unit 223 provided in the transmitting information processing section 22#1 receives the data string 1002 in which the delimiter information is inserted by the delimiter information insertion unit 222, and performs a process to copy the data string 1002. In this case, one copy of the data string 1002 having the same content is generated according to the two communication networks 5 and 6 corresponding to the two communication units 151 and 152 being used in the mobile terminal (step S26).

Then, the data transfer unit 24 transmits the two data strings 1002 having the same content to the mobile terminal 1 through the communication networks 5 and 6, respectively (step S27).

In the mobile terminal 1, the data transfer unit 14 receives the receiving data (data strings 1002) having the same content transmitted through the communication networks 5 and 6 and temporarily stores them, and sets the receiving information processing section 13#1 corresponding to the receiving information inside the receiving information processor 13 (step S28).

Then, the receiving information distributing unit 16 distributes the receiving information (data strings 1002) to the receiving information synthesizing unit provided in the receiving information processing section 13#1 (step S29).

The receiving information synthesizing unit 131 receives the receiving information (data string 1002) from the receiving information distributing unit 16, and performs a synthesizing process to the receiving information (step S30).

At this time, the receiving information synthesizing unit 131 records the latest data position of the pieces of data received in accordance with the sequence number which is a component of the delimiter information included in the receiving information.

Further, for the information older than the recorded latest data position, that is, for the data having been received, the receiving information synthesizing unit 131 discards it. When the receiving information synthesizing unit 131 receives information including a new data position, the unit updates the record of latest data position, and forwards the receiving information to the delimiter information elimination unit 132.

Thereby, it is possible to perform a synthesizing process without causing a loss of data regardless of a difference in the line speeds and communication states of the communication networks used for communications (in this case, communication networks 5 and 6).

Next, the delimiter information elimination unit 132 performs a delimiter information elimination process to the synthesized data string 1002. Specifically, the delimiter information elimination unit 132 converts the data string 1002 in FIG. 3 into the data string 1001 (step S31).

Then, the data inversion unit 133 provided in the transmitting information processing section 13#1 receives the data string 1001 from the delimiter information elimination unit 132, and performs a data inversion process to the data string 1001. Specifically, the data inversion unit 133 converts the data string 1001 in FIG. 3 into the data string 1000 (step S32).

Finally, the communication service execution unit 11 receives the data string 1000, thereby one session for transmitting the information from the server 2 to the mobile terminal 1 is completed (step S33).

It is noted that after the step S29 in the description of operation (2) of the first exemplary embodiment given above, a communication unit used for the communication service can be switched from the one communication unit 151 to the other communication un t 152 by the communication switching operation (see *2 in FIG. 6, communication limiting step) so as to stop the one communication unit 151, of the communication units 151 and 152 being operated in parallel in the mobile terminal 1.

Further, the communication switching operation to end the switching of the communication unit (see *2 in FIG. 6) can be performed at any time in the time zone up to the time that the mobile terminal 1 performs a transmitting or receiving operation in the next session following the above-described session (steps S21 to S34).

Further, the communication switching operation can be performed at any time if a transmitting/receiving operation has not been performed between the mobile terminal 1 and the server 2 after a plurality of communication units are set to be in an operating state in parallel in the mobile terminal 1 (step S22) or in a state before transmitting the transmitting information.

Further, in the description of operation (2) of the first exemplary embodiment, if the time interval between the timing of performing the copied information transmitting step (step S29) and the timing of performing the switching operation is long, a sufficient time is allowed to receive the pieces of transmitting information having the same content in the mobile terminal 1. Therefore, it is possible to perform an operation to switching a communication network more stably while preventing a loss of communication information.

As described above, according to the first exemplary embodiment, the transmitting information processors and the receiving information processors provided in the mobile terminal 1 and the server 2 perform processing in association with the communication information provided by the communication service being used, so it is possible to switch the communication network being used in a smooth manner without causing a loss or delay of the communication information in the mobile terminal 1 and without interrupting the communication service.

Further, with the descriptions of operation (1) and (2) of the first exemplary embodiment, a user of the mobile terminal 1 can switch the communication network to be used from one to another at any timing without being aware of the communicating state of whether the mobile terminal being in a transmitting state or in a receiving state, or a timing of the switching operation.

It is noted that although in the description above an example of switching from the communication unit 151 to the communication unit 152 provided in the mobile terminal 1 has been given, it is possible to switch a communication unit in the same manner as described in the first exemplary embodiment even in a case where three or more communication units are being operated in parallel in the mobile terminal.

Second Exemplary Embodiment

Next, a communication service continuation system according to a second exemplary embodiment of the present invention will be described.

The same components as those in the first exemplary embodiment described above are denoted by the same reference numerals.

The second exemplary embodiment differs from the first exemplary embodiment in that a proxy server 3 is incorporated as a device of the system, and the proxy server 3 includes the transmitting information processor 22 and the receiving information processor 23 which are provided in the server 2 in the first exemplary embodiment.

With such a configuration, the server 2 can reduce the operation load placed by the processing to the communication information. Further, since the operation of the server 2 can be limited to a process for providing a communication service which is a main function, the speed and efficiency of the processing operation of a communication service can be improved in the entire system.

The proxy server 3 according to the exemplary embodiment relays communications between the mobile terminal 1 and the server 2. It is noted that the communicating operation performed between the mobile terminal 1 and the proxy server 3 is almost same as the communicating operation performed between the mobile terminal 1 and the server 2 in the first exemplary embodiment.

Hereinafter, the configuration thereof will be described.

As shown in FIG. 7, the second exemplary embodiment is configured such that the server 2 in the first exemplary embodiment described above (FIG. 1) and the proxy server 3 having a function of relaying communications between the mobile terminal 1 and the server 2 are provided together, and the proxy server 3 connects to the public network 8.

As shown in FIG. 8A, the mobile terminal 1 has the same configuration as that of the first exemplary embodiment.

As shown in FIG. 8C, the server 2 includes a communication unit 25 directly connecting to the public network, a data transfer unit 24 which performs a transmitting and receiving operation of data via the communication unit 25, and a communication service providing unit 21 for providing a communication service to the mobile terminal 1 via the data transfer unit 24 and the communication unit 25, same as the server 2 of the first exemplary embodiment.

As shown in FIG. 8B, the proxy server 3 includes a communication unit 35 which directly connects to the public network 8, and a data transfer unit 32 which executes a transmitting and receiving operation of data performed with the mobile terminal 1 or the server 2 via the communication unit 35.

Further, the proxy server 3 includes a proxy execution unit 31 havinq a communication relaying function to relay transmission and reception of data performed between the m mobile terminal 1 and the server 2, a transmitting information processor 32 which performs a copying process to the information (hereinafter referred to as a "relay-transmitting information") to be transmitted from the server 2 to the mobile terminal 1 via the proxy execution unit 31, and a receiving information processor 33 which performs a synthesizing and restoring process to the information (referred to as a "relay-receiving information") to be transmitted from the mobile terminal 1 to the server 2 via the proxy server 3.

Further, the proxy server 3 includes a receiving information distribution unit 36 which distributes the relay-receiving information received by the data transfer unit 34 provided in the proxy server 3 to the receiving information processor 33.

Hereinafter, the respective configurations of the system according to the second exemplary embodiment will be described in detail.

As shown in FIGS. 8B and 8C, the communication units 25 and 35 provided in the server 2 and in the proxy server 3 respectively are configured to include data communication units 251 and 351 (hereinafter referred to as a "communication unit 251" and a "communication unit 351") corresponding to the public network 8.

The communication service providing unit 21 in the server 2 performs communications with the communication service execution unit 11 in the mobile terminal 1 to thereby provide a communication service to the mobile terminal 1, which is the same as the first exemplary embodiment.

Further, the communication service providing unit 21 has a transmitting information generating function to generate transmitting information to be transmitted to the mobile terminal 1.

The data transfer unit 24 has a data transmitting function to transmit the transmitting information received from the service providing unit 21 to the proxy server 3 via the public network 8, and a data receiving function to receive the information transmitted from the proxy server 3 and forward the information to the execution unit 21.

In this exemplary embodiment, the transmitting information processor 22 and the receiving information processor 23 provided in the server 2 of the first exemplary embodiment are replaced with the transmitting information processor 32 and the receiving information processor 33 provided in the proxy server 3 which will be described later.

Thereby, since the object of the operating process performed by the server 2 can be limited to execution of a communication service, the operating process can become more effective and performed at higher speed.

Further, by limiting the object of the operating process performed by the proxy server 3 to processing with respect to transmitting and receiving information, it is possible to improve the efficiency of the process of communication data in the entire system, and to reduce delay of communication data.

The proxy execution unit 31 provided in the proxy server 3 has a communication relay function to relay communications performed between the communication service execution unit 11 in the mobile terminal 1 and the communication service providing unit 21 in the server 2, and a transmitting information processor setting function to set transmitting information processing sections (32#1, 32#2, . . . ) inside the transmitting information processor 32 corresponding to the relay-transmitting information, for performing processing to the relay-transmitting information to be transmitted from the server 2 to the mobile terminal 1.

The transmitting information processor 32 of the proxy server 3 has a configuration and functions which are the same as those of the transmitting information processor 22 in the server 2 of the above-described first exemplary embodiment, including the transmitting information processing sections 32#1, 32#2, . . . set corresponding to the relay-transmitting information which is to be transmitted from the server 2 to the mobile terminal 1 and relayed by the proxy server 3.

The transmitting information processor 32#1 includes components which perform processing to the relay-transmitting information distributed from the proxy execution unit 31, that is, a data conversion unit 321, a delimiter information insertion unit 322, a transmission data branching unit 323, as processing units for the transmitting information.

It is noted that the transmitting information processing sections 32#2, 32#3, . . . , set corresponding to the relay-transmitting information, also have the same configuration.

The receiving information processor 33 has the same configuration and functions as those of the receiving information processor 22 provided in the server 2 of the first exemplary embodiment, including the receiving information processing sections 33#1, 33#2, . . . set corresponding to the relay-receiving information to be transmitted from the mobile terminal 1 to the server 2 and relayed by the proxy server 3.

Further, the receiving information processor 33#1 includes components to perform processing to the relay-receiving information distributed by the receiving information distribution unit 36, that is, a receiving information synthesizing unit 331, a delimiter information elimination unit 332 and a receiving data inversion unit 333, which are processing units for the relay-receiving information.

It is noted that the receiving information processing sections 33#2, 33#3, . . . , set corresponding to each piece of relay-transmitting information with different session, also have the same configuration.

The functions provided to the data conversion unit 321, the delimiter information insertion unit 322 and the transmitting information branching unit 323, held by each of the transmitting information processing sections 32#1, 32#2, . . . in the transmitting information processor 32, are the same as those of the transmitting information processor 22 in the server 2 of the first exemplary embodiment.

Further, the functions provided to the receiving information synthesizing unit 331, the delimiter information elimination unit 332 and the receiving data inversion unit 333, held by each of the receiving data processing sections 33#1, 33#2, . . . in the receiving information processor 33, are the same as those of the receiving information processor 23 in the server 2 of the first exemplary embodiment.

The data transfer unit 34 has, in the transmitting and receiving operation performed between the proxy server 3 and the mobile terminal 1, a distributing and transmitting function to distribute pieces of relay-transmitting information having the same content which are copied by the transmitting information processing sections 32#1, 32#2, . . . respectively to communication units having been set to be in an operating state, and to transmit them to the mobile terminal 1 via the communication units, and a receiving information processing section setting function to receive the relay-receiving information transmitted from the mobile terminal 1 and to set the receiving information processing sections 33#1, 33#2, . . . for performing a synthesizing and restoring process to the information.

Further, the data transfer unit 34 has, in the transmitting and receiving operation with the server 2, a transmission relaying function to forward the relay-transmitting information transmitted from the server 2 to the proxy execution unit 31, and a reception relaying function to transmit the relay-receiving information, in which the synthesizing processing has been performed and which is temporarily stored in the proxy execution unit 31, to the server 2.

The receiving information distribution unit 36 has a receiving information distributing function to distribute the relay-receiving information transmitted from the mobile terminal 1 which is temporarily stored in the data transfer unit 34, to the receiving information processing sections 33#1, 33#2, . . . previously set, while determining from the session identification information included in the relay-receiving information.

Other configurations are the same as those of the first exemplary embodiment.

Description of Operation (1) of Second Exemplary Embodiment

Next, the overall operation (1) of the second exemplary embodiment given above will be described.

In the communication service continuation system configured as the second exemplary embodiment, a user of the mobile terminal 1 is using a communication service provided by the server 2 using one communication network 5 among the three communication networks provided in parallel in the same manner as the first exemplary embodiment.

In this state, in the mobile terminal 1, the communication unit 152 corresponding to another communication network 6 is activated to thereby perform the communication service using the communication networks 5 and 6 in parallel.

Then, the mobile terminal 1 performs a copying process to the transmitting information of the communication service to be transmitted to the server 2, and transmits the pieces of information through the one and the other communication networks 5 and 6 being operated in parallel.

Then, the proxy server 3 receives the pieces of relay-receiving information having the same content transmitted from the mobile terminal 1. To the received relay-receiving information, the receiving information processor 33 in the proxy server 3 performs a synthesizing and restoring process, and temporarily stores the relay-receiving information restored by the proxy execution unit 31.

Then, the proxy server 3 transmits the relay-receiving information to the server 2, and the communication service providing unit 21 in the server 2 receives the information.

Thereby, one session of a communicating operation (transmitting operation of the mobile terminal 1 and receiving operation of the server 2) performed between the mobile terminal 1 and the server 2 is completed.

Figure 9:
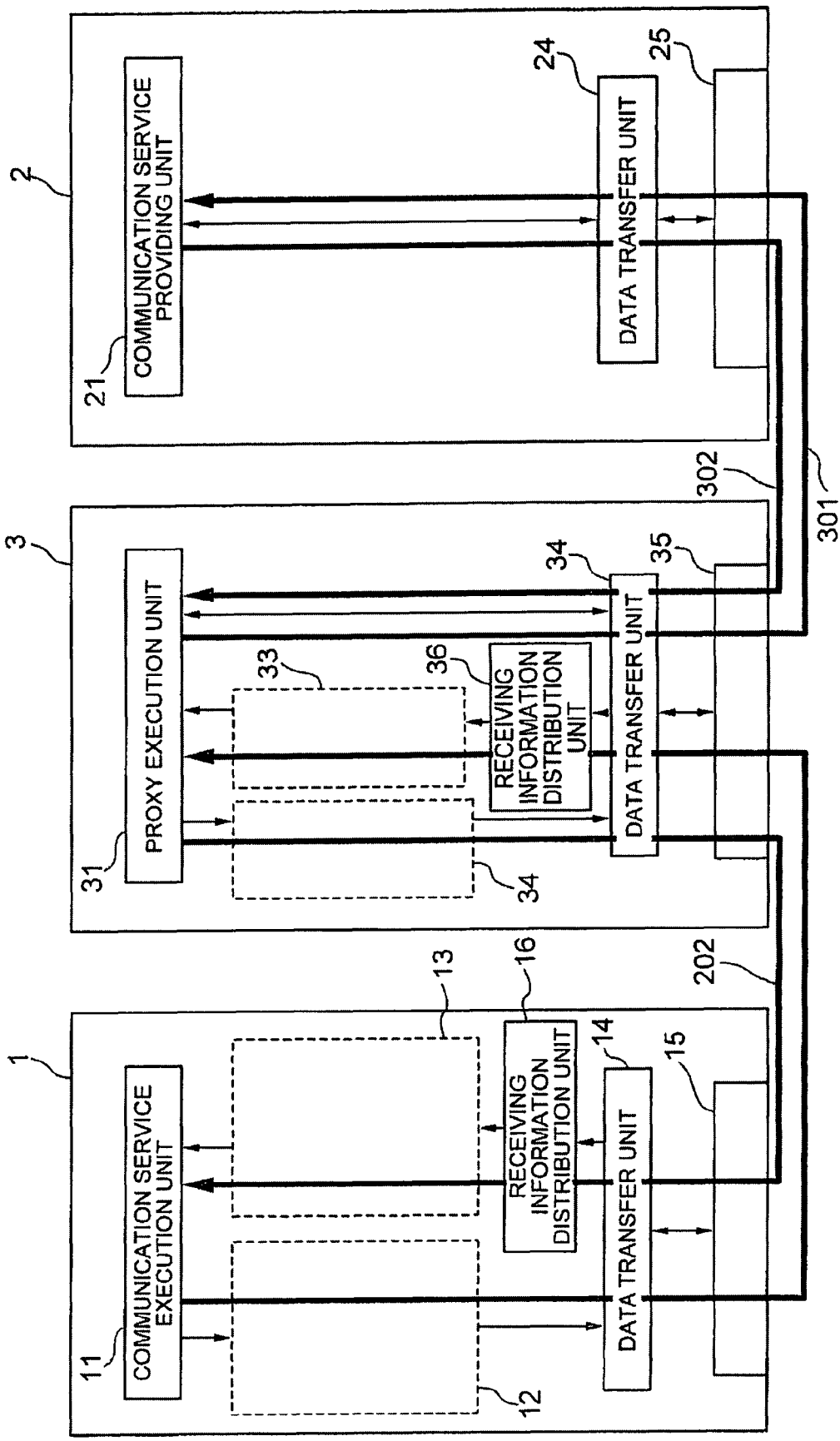
FIG. 9 illustrates a transmitting direction of communication data in the second exemplary embodiment.

In FIG. 9, the flow of communication data by the operations described above is expressed by arrows 201 and 301.

Next, the description of operation [1] of the second exemplary embodiment will be described in more detail.

Figure 10:
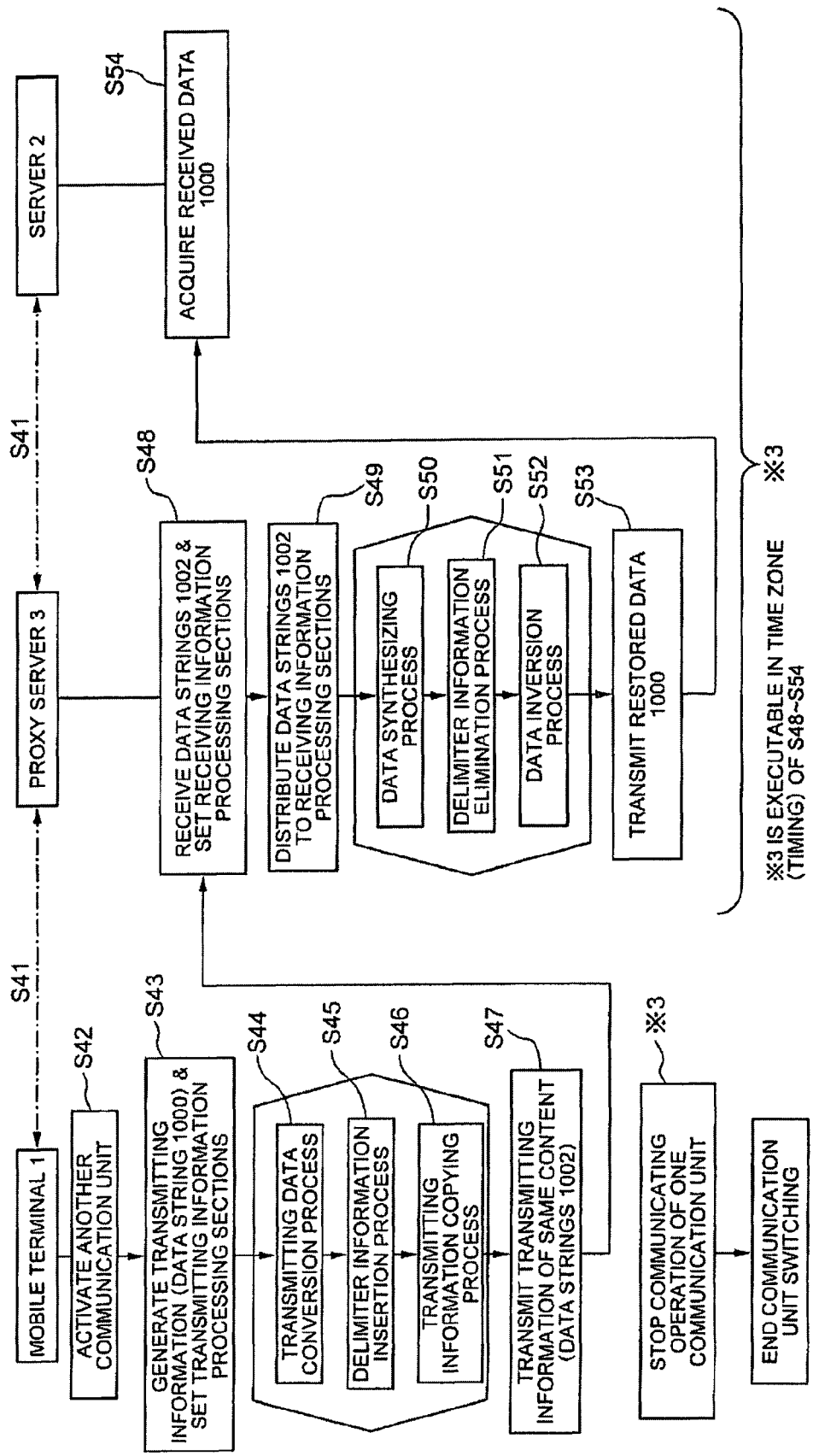
FIG. 10 is a flowchart showing a description of operation (1) of the overall communication service continuation system according to the second exemplary embodiment.

Among the communicating operations of the communication service continuation system of the second exemplary embodiment, an operation to switch a communication unit in the transmitting operation from the mobile terminal 1 to the server 2 will be described based on the flowchart of FIG. 10.

The mobile terminal 1 and the server 2 are performing communications with each other through the proxy server 3 and the communication network 5 to thereby execute a communication service provided by the server 2 (step S41).

The mobile terminal 1 activates the communication unit 152 provided in the mobile terminal 1 while maintaining the communicating state with the proxy server 3 through the communication unit 151 and the communication network 5 to thereby set a state where communications can be performed with the proxy server 3 using the corresponding communication networks 5 and 6 in parallel (step S42).

Then, the communication service execution unit 11 of the mobile terminal 1 generates transmitting information (data string 1000) to be transmitted to the server 2, and sets the transmitting information processing section 12#1 6 corresponding to the transmitting information (data string 1000) (step S43).

The copying process (step S44 to S46) performed to the transmitting information by the transmitting information processing section 12#1 is the same as the steps S4 to S6 in the description of operation (1) of the first exemplary embodiment described above.

After the copying process, the data transfer unit 14 distributes the data strings 1002 having the same content to the data communication units 151 and 152 being operated, and transmits them to the proxy server 3 through the communication networks 5 and 6 corresponding to the respective communication units (step S47).

Then, in the proxy server 3, the data transfer unit 34 relay-receives the pieces of information (data strings 1002) having the same content transmitted through the communication networks 5 and 6 respectively, and sets the receiving information processing section 33#1 corresponding to the data strings 1002 (relay-receiving information) (step S48).

Then, the receiving information distribution unit 36 distributes the data strings 1002 to the receiving information synthesizing unit 331 provided in the receiving information processing section 33#1 (step S49).

The synthesizing and restoring process (step S50 to S52) that the receiving information processing section 33#1 performed to the relay-receiving information is the same as the process of steps S10 to S12 in the description of operation (1) of the first exemplary embodiment described above.

Following the synthesizing and restoring process, the proxy execution unit 31 receives the data string 1000 restored in this stage and temporarily stores it, and the data distribution unit 36 transmits the data string 1000 to the server 2 (step 553).

In FIG. 9, the flow of the relay-receiving information is indicated by an arrow 201.

Next, the data transfer unit 42 in the server 2 receives the data string 1000 transmitted from the proxy server 3, and the communication service providing unit 21 receives the data string 1000 (step S54).

Thereby, one session in which information of the communication service is transmitted from the mobile terminal 1 to the server 2 via the proxy server 3 is established.

In FIG. 9, the flow of the relay-receiving information is indicated by an arrow 301.

After the step S48 described in the description of operation (1) of the second exemplary embodiment, communication units used for execution of the communication service can be switched from one communication unit 151 to another communication unit 152 by performing a communication switching operation (see *3 in FIG. 10, communication limiting step) to set the one communication unit 151, of the communication units 151 and 152 being operated in parallel in the mobile terminal 1, to be in a stopped state.

It is noted that the operation to switch a communication unit can be performed at any time in a time zone until the mobile terminal 1 performs a transmitting or receiving operation in the next session.

Further, the switching operation can be performed after a plurality of communication units are set to be in an operating state in parallel in the mobile terminal 1 (step S22), if a transmitting and receiving operation has not been performed between the mobile terminal 1 and the server 2 or if it is in a state before transmitting information.

Furthermore, in the description of operation (1) of the second exemplary embodiment, if the time interval between the timing of performing the copied information transmitting step (step S47) and the timing of performing the switching operation (see *3 in FIG. 10) is long, a sufficient time is allowed for receiving the pieces of transmitting information having the same content in the server. Therefore, it is possible to perform an operation to switch a communication network more stably while preventing a loss of communication information.

Next, the overall operation of an operation 2 the second exemplary embodiment will be described.

In the communication service continuation system configured as the second exemplary embodiment, a user of the mobile terminal 1 is using a communication service provided by the server 2 through one communication network 5 among the three communication networks provided in parallel, in the similar manner as the description of operation (1) of the second exemplary embodiment.

In this state, with another communication unit 152 being activated in the mobile terminal 1, the communication service is performed using the communication networks 5 and 6 in parallel.

Then, the server 2 generates transmitting information for the communication service and transmits it to the mobile terminal 1.

Then, the proxy server 3 receives the information transmitted by the server 2 (hereinafter referred to as "relay-transmitting information") and performs a copying process to the relay-transmitting information.

Then, the proxy server 3 transmits the pieces of relay-transmitting information having the same content to the mobile terminal 1 through the communication networks 5 and 6 being operated in parallel.

Then, the receiving information processor 13 in the mobile terminal 1 performs a synthesizing and restoring process to the relay-transmitting information received, and the communication service execution unit 11 receives the restored information.

Thereby, one session of a communicating operation performed between the mobile terminal 1 and the server 2 (transmitting operation of the server 2 and receiving operation of the mobile terminal 1) is completed.

In FIG. 9, the flow of communication data by the operations described above is indicated by arrows 302 and 201.

Description of Operation (2) of the Second Exemplary Embodiment

Among the operations of the communication service continuation system of the second exemplary embodiment, a communication unit switching operation in the case that a user of the mobile terminal 1 switches a communication unit and a communication network, when communication data is being transmitted from the server 2, will be described below based on the flowchart of FIG. 11.

The mobile terminal 1 and the server 2 is performing communications with each other via the proxy server 3 and the communication network 5 which is one of the three communication networks provided in parallel to thereby execute a communication service provided by the server 2 (step S61).

In this state, the mobile terminal 1 activates the communication unit 152 provided in the mobile terminal 1 while maintaining a communicating state with the communication unit 151 and with the proxy server 3 through the communication network 5, to thereby set a state where communications can be performed using the communication networks 5 and 6 in parallel (step S62).

At this time, the communication service providing unit 21 of the server 2 generates transmitting information (data string 1000) to be transmitted to the mobile terminal 1, and the data transfer unit 24 transmits the transmitting information (data string 1000) to the proxy server 3 (step S63).

Then, in the proxy server 3, the data transfer unit 34 receives the information (data string 1000) transmitted from the server 2, and the proxy execution unit 31 receives the data string 1000 and temporarily stores it (step S64).

In FIG. 9, the flow of data 1000 is indicated by an arrow 302.

Then, the proxy execution unit 31 sets the transmitting information processing section 3241 corresponding to the data string 1000 which is relay-transmitting information to be transmitted to the mobile terminal 1 (step S65).

In this case, the processing (steps S66 to S68) that the transmitting information processing section 32#1 performs to the relay-transmitting information is same as the steps S24 to S26 in the description of operation (2) of the first exemplary embodiment. First, the data conversion unit 321 provided in the transmitting information processing section 32#1 receives the relay-transmitting information from the proxy execution unit 31, and performs a data conversion process to the relay-transmitting information (step S66). Specifically, a process to convert the data string 1000 in FIG. 3 into the data string 1001 is performed.

Then, the delimiter information insertion unit 322 receives the data string 1001 from the data conversion unit 321, and performs a delimiter information insertion process to the data string 1001 (step S67). Specifically, a process to convert the data string 1001 in FIG. 3 into the data string 1002 is performed.

Then, the data branching unit 323 receives the data string 1002 in which the delimiter information is inserted by the delimiter information insertion unit 322, and performs a copying process to the data string 1002 corresponding to the communication units 151 and 152 being operated. In this case, one copy of the data string 1002 having the same content is generated by the copying process (step S68).

Then, the data transfer unit 34 distributes the two data strings 1002 having the same content to the communication networks 5 and 6 corresponding to the communication units 151 and 152 being operated in the mobile terminal 1 respectively, and transmits the data strings to the mobile terminal 1 through the communication networks 5 and 6 (step S69).

Then, in the mobile terminal 1, the data transfer unit 14 receives the data strings having the same content transmitted from the proxy server 3 through the communication units 151 and 152 being operated, and sets the receiving information processing section 13#1 corresponding to the information (step S70).

Then, the receiving information distribution unit 16 distributes the data strings 1002 received by the data transfer unit 14 to the receiving information synthesizing unit 131 provided in the receiving information processing section 13#1 (step S71).

It is noted that the synthesizing and restoring process (steps S72 to 74) performed by the receiving information processing section 13#1 to the receiving information are same as the synthesizing and restoring process of the steps S31 to S32 in the description of operation (2) of the first exemplary embodiment.

Finally, the communication service providing unit 21 receives the data string 1000 restored by the receiving information processing section 13#1.

Thereby, one session in which communication information is transmitted from the server 2 to the mobile terminal 1 via the proxy server 3 is completed.

In FIG. 9, the flow of the relay-transmitting information from the proxy execution unit 31 to the communication service execution unit 21 is indicated by an arrow 202.

It is noted that after the step S71 in the description of operation (2) of the second exemplary embodiment, the communication unit to be used for executing the communication service can be switched from one communication unit 151 to another communication unit 152 by performing a communication switching operation (refer to *4 in FIG. 11, communication limiting step) for setting the one communication unit 151, of the communication units 151 and 152 being operated in parallel in the mobile terminal 1, to be in a communication stopped state.

As described above, according to the second exemplary embodiment, the transmitting information processing sections and the receiving information processing sections provided in both of the mobile terminal and the server processes communication information of a communication service being executed in association with one another. Thereby, a communication unit and a communication network, which are being used, can be switched in a smooth manner without causing a loss of communication information and delay in the mobile terminal and without causing interruption and reconnection of the communication service.

It is noted that the communication switching operation of the communication unit can be performed at any time in a time zone until a transmitting or receiving operation is performed by the mobile terminal 1 in the next session.

Further, a switching operation can be performed if a transmitting or receiving operation has not been performed between the mobile terminal 1 and the server 2 after a plurality of communication units are set to be in an operating state in parallel (step S62) in the mobile terminal 1 or if it is in a state before transmitting information.

Furthermore, if a time interval between the timing of performing the copied information transmitting step (step S69) and the timing of performing the switching operation (refer to *4 in FIG. 11) is long in the description of operation (2) of the second exemplary embodiment, a sufficient time is allowed for receiving the pieces of transmitting information having the same content by the server. Therefore, it is possible to switch a communication network stably while preventing a loss of communication information.

Further, with the descriptions of operation (1) and (2) of the second exemplary embodiment, a user of the mobile terminal 1 can switch communication units and communication networks being used from one to another at any time without recognizing the communicating state of the mobile terminal, that is, without recognizing whether the mobile terminal is in a transmitting state or in a communicating state, and the timing of a switching operation.

It is noted that although an example of switching the communication unit 151 to the communication unit 152 provided in the mobile terminal 1 is shown in the second exemplary embodiment, communication units can be switched by the same manner as the second exemplary embodiment even in the case where three or more communication units are set to be in an operating state in the mobile terminal.

The second exemplary embodiment according to the present invention is configured and works as described above, so the second exemplary embodiment has the same operating effects as those of the first exemplary embodiment. Further, since the proxy server 3 can perform processing for preventing a loss of communication data from being caused during the communications of transmitting and receiving information of the communication service or caused at the time of switching communication units independent from the operation of the server 2, the exemplary embodiment can achieve an effect that an improvement in communication efficiency and speeding-up can be reflected on the entire system effectively.

Next, other exemplary embodiments of the present invention will be described.

As a third exemplary embodiment of the invention, the server may be configured to include a receiving information processor having a receiving information synthesizing function to synthesize a set of information from pieces of receiving information having the same content which are received through the one and the other communication networks.

Thereby, the pieces of information having the same content transmitted from the mobile terminal through the communication networks provided in parallel are synthesized and restored in the server in which the pieces of information have been received, so the pieces of information are restored to the original information generated in the mobile terminal, and the information is forwarded to the server.

Further, as a fourth exemplary embodiment of the invention, the transmitting information processing section in the mobile terminal may include a communication service execution unit which executes a communication service provided by the server.

Thereby, communication services and client application programs can be performed independent of communicating operations performed between the mobile terminal and the server. This enables to speed up and stabilize the processes of the communicating operations and to stabilize operations to perform communication services.

Further, as a fifth exemplary embodiment of the invention, the communication service execution unit of the mobile terminal may include a transmitting information processing device setting function to set one or more transmission information processing sections corresponding to transmission information inside the transmitting information processor.

Thereby, processing can be performed to pieces of communication information in parallel, and transmitting information processing sections can be set corresponding to the communication information generated. This enables to reduce the processing load in the entire system, and to improve the communication efficiency.

Further, as a sixth exemplary embodiment of the invention, the server may include a transmitting information processing section having a copied information transmitting function to copy transmitting information to be transmitted to the mobile terminal, and to transmit pieces of information having the same content through the one and the other communication networks. The mobile terminal may include a receiving information processing section having a receiving information synthesizing function to synthesize the pieces of information having the same content transmitted from the server.

Thereby, the pieces of information having the same content transmitted from the server are restored to the original information generated in the mobile terminal through the synthesizing and restoring process performed in the mobile terminal which has received the information, and a user of the mobile terminal can use a communication unit to which the communication is switched in a continuing manner, without ending or interrupting the communication service being executed, even if the communication network and the communication unit are switched during execution of the communication service and during the time of receiving data from the server.

Further, as a seventh exemplary embodiment of the invention, the transmitting information processing section in the server may also include a communication service providing unit which provides a communication service to the mobile terminal.

Thereby, execution of communication services and server application programs can be performed independent of communicating operations performed between the mobile terminal and the server. This enables to speed up and stabilize processes for communicating operations and to stabilize operations to execute communication services.

Further, as an eighth exemplary embodiment of the invention, the communication service providing unit of the server may have a transmitting information processing device setting function to set one or more transmitting information processing sections corresponding to transmission information inside the transmitting information processor.

Even with this configuration, processing can be performed to multiple pieces of communication information in parallel, and transmission information processing sections are set corresponding to the communication information generated. Thereby, it is possible to reduce the processing burden in the entire system, and to improve the communication efficiency.

Further, as a ninth exemplary embodiment of the invention, the server may include communication units corresponding to the communication networks provided in parallel, and a data transfer unit which performs transmission and reception of necessary information with the mobile terminal through the communication units.

Further, as a tenth exemplary embodiment of the invention, the mobile terminal may include communication units corresponding to the communication networks provided in parallel, and a data transfer unit which performs transmission and reception of necessary information with the server through the communication networks, together with the communication units.

Thereby, the mobile terminal can perform processing for communications independent of the processing for the communication information, so it is possible to speed up the communication process in the entire system, and to perform operations to switch the communication units stably.

Further, as an eleventh exemplary embodiment of the invention, each of the transmitting information processors may includes one or more transmission information processing sections previously set, and each of the transmission information processing sections may include: a data conversion unit which sets a position to insert delimiter information by exchanging data of a specific position of the transmitting information; a delimiter information insertion unit which inserts delimited information at the data position of the transmitting information previously set; and a transmitting information copying unit which copies the transmitting information corresponding to the communication units being operated.

Thereby, copies of the transmitting information can be generated corresponding to the respective communication networks being used in parallel, and the information can be transmitted in the form of not causing a loss of communication data when the communication network being used is switched.

Further, as a twelfth exemplary embodiment of the invention, each of the receiving information processor may include one or more receiving information processing sections previously set, and each of the receiving information processing sections may include: a receiving information synthesizing unit which synthesizes a set of receiving information from the pieces of receiving information having the same content received through the one and the other communication networks; a delimiter information elimination unit which eliminates the delimiter information from the synthesized information; and a data inversion unit which performs an inversion process to restore the data portions, to which a conversion process is performed in the transmitting side, of the receiving information in which the delimiter information is eliminated.

Thereby, it is possible to restore the transmitted information to the original form without causing a loss of communication data when the communication network being used is switched, and to continue execution of the communication service using the restored information.

Further, as a thirteenth exemplary embodiment of the invention, each of the data transfer units may be provided together with a receiving information distributing unit which distributes receiving information to the receiving information processing sections.

Thereby, transmitting and receiving operations to the communication networks provided together with the mobile terminal and the server are performed efficiently, so it is possible to speed up the communication process in the entire system.

Further, as a fourteenth exemplary embodiment of the invention, each data transfer unit may have a receiving information processing section setting function to set one or more receiving information processing sections corresponding to the receiving information inside the receiving information processor.

This enables to perform processing to multiple pieces of communication information in parallel, to reduce the processing burden on the entire system, and to improve the communication efficiency, since receiving information processing sections are set corresponding to the communicating information generated.

Further, as a fifteenth exemplary embodiment of the invention, in the communication service continuation system including a server which provides communication services and a mobile terminal connected to the server via communication networks provided in parallel, a proxy server having a communication relaying function to relay communications between the server and the mobile terminal is also provided, and the mobile terminal includes a transmitting information processor having a copied information transmitting function to maintain a communication state with the proxy server using one communication network and also activate the other communication network, and to copy transmitting information to be transmitted to the proxy server to thereby transmit pieces of information having the same content through the one and the other communication networks. The transmitting information processor has a communication network switching function to switch from the one communication network being used to the other communication network, while maintaining a communication state with the proxy server. Further, the proxy server includes a receiving information processor having a receiving information synthesizing function to synthesize a set of information from the pieces of receiving information having the same content which are received from the mobile terminal through the one and the other communication networks.

Thereby, the functional burden on the server which provides communication services in the present system can be reduced, and the processing and communicating efficiency with respect to communication information can be improved.

Further, at the time of transmitting communications for a communication service in the mobile terminal, it is possible to switch the communication unit being used while maintaining execution of the communication service.

Further, as a sixteenth exemplary embodiment of the invention, the proxy server may include a transmitting information processor having a copied information transmitting function to activate another communication network while maintaining a communicating state with the mobile terminal through one communication network being used, and to copy transmitting information to be transmitted to the mobile terminal to thereby transmit pieces of information having the same content through the one and the other communication networks, and the mobile terminal may include a receiving information processor having a receiving information synthesizing function to synthesize a set of information from the pieces of information having the same content received through the one and the other communication networks.

Thereby, at the time of receiving communications of the communication service on the mobile terminal side, the communication unit being used can be switched while maintaining execution of the communication service.

Further, as a seventeenth exemplary embodiment of the invention, a receiving information synthesizing step, in which pieces of information having the same content are received by the server through one and the other communication networks and are synthesized, may be set before the communication limiting step.

Thereby, the mobile terminal can switch communication networks (communication units) to be used at any time after the operation to transmit the transmitting information. This enables to perform a switching operation at a wide variety of timings and time zones.

Further, as an eighteenth exemplary embodiment of the invention, a receiving information synthesizing step, in which pieces of information having the same content are received by the server through one and the other communication networks and are synthesized, may be provided after the communication limiting step.

Thereby, an operation to switch communication networks (communication units) is performed in the mobile terminal side in a state where it is confirmed that information transmitted from the mobile terminal to the server is received by the server. This enables to prevent a loss of information almost totally at the time of switching operation.

Further, as a nineteenth exemplary embodiment of the invention, the communication service continuation program according to the present invention is for switching a communication network being use to another communication network in the mobile terminal side in performing communications between a mobile terminal and a server through communication networks provided in parallel. The program causes a computer to perform: a parallel communicating function to activate another communication network while maintaining a communication state using one communication network; a receiving information synthesizing function to receive pieces of information having the same content transmitted from the server through the one and the other communication networks being operated in parallel and to synthesize a set of information from the pieces of information; and a communication limiting function to stop the communicating state of one communication network of the communication networks being operated in parallel during execution of the receiving information synthesizing function.

Even with this configuration, it is possible to switch the communication unit being used in the mobile terminal at the best timing for preventing a loss of communication information of the communication service while continuing execution of the active communication service, regardless of whether wired or wireless.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

According to the present invention, in a communication system capable of using a plurality of communication networks (and communication units), it is possible to realize a communication service system capable of effectively utilizing communication services to be provided. Therefore, the present invention has large applicability in the fields of mobile telephone communications and mobile terminal communications.

What is claimed is:

1. A communication service continuation system comprising:
   a server which provides a communication service;
   a mobile terminal which receives the communication service provided by the server; and
   communication networks which connect the server and the mobile terminal,
   wherein the communication networks include: a mobile terminal communication network, a wireless LAN communication network, a network interface communication network, and a public network commonly connected with the communication networks,
   wherein the mobile terminal communication network, the wireless LAN communication network, the network interface communication network are provided in parallel and connected with the mobile terminal, and the public network is connected with the server,
   wherein the mobile terminal includes:
   a transmitting information processor which performs a copying process with respect to transmitting information to be transmitted to the server,
   a receiving information processor which performs a synthesizing and restoring process with respect to receiving information transmitted from the server, by recording a latest data from among data received in accordance with a sequence number which is a component of delimiter information included in the receiving information transmitted from the server and discarding data which has been received; and
   data transferring means which activates, while maintaining a communicating state with the server using one communication network of at least two communication networks of the communication networks provided in parallel, another communication network to transmit multiple pieces of transmitting information of the same content copied by the transmitting information processor via the at least two communication networks, and receives the receiving information from the server via the at least two communication networks,
   and wherein the server includes:
   a transmitting information processor which performs a copying process with respect to transmitting information to be transmitted to the mobile terminal,
   a receiving information processor which performs a synthesizing and restoring process with the respect to receiving information transmitted from the mobile terminal, by recording a latest data from among data received in accordance with a sequence number which is a component of delimiter information included in the receiving information transmitted from the mobile terminal and discarding data which has been received; and
   data transferring means which transmits multiple pieces of transmitting information of the same content copied by the transmitting information processor via the at least two communication networks set by the data transferring means of the mobile terminal, and receives the receiving information from the mobile terminal via the at least two communication networks set by the data transferring means of the mobile terminal.

2. The communication service continuation system, according to claim 1, wherein in addition to the transmitting information processor, the server further includes a communication service providing unit which provides a communication service to the mobile terminal.

3. The communication service continuation system, according to claim 2, wherein the communication service providing unit in the server has a transmitting information processing section setting function to set one or more communication information processing sections corresponding to the pieces of transmitting information, within the transmitting information processor.

4. The communication service continuation system, according to claim 1, wherein the receiving information processor includes one or more receiving information processing sections previously set, and each of the receiving information processing sections includes:
   a receiving information synthesizing unit which synthesizes a set of information from the pieces of receiving information having the same content received through the one communication network and the other communication network;
   a delimiter information elimination unit which eliminates the delimiter information from the set of information synthesized, and a data inversion unit which performs an inversion process to restore the part of the data, to which a conversion process has been performed on a transmitting side, of the receiving information from which the delimiter information is eliminated.

5. The communication service continuation system, according to claim 1, wherein in addition to the data transfer unit, the server further includes a receiving information distribution unit which distributes receiving information to the receiving information processor.

6. The communication service continuation system, according to claim 1, wherein the data transfer unit has a receiving information processing section setting function to set one or more receiving information processing sections corresponding to the receiving information, within the receiving information processor.

7. The communication service continuation system, according to claim 1, further comprising a proxy server together with the server, the proxy server having a communication relaying function to relay communications between the server and the mobile terminal, wherein the mobile terminal includes a transmitting information processor having:
   a copied information transmitting function to, while maintaining a communicating state with the proxy server using one communication network, activate another communication network, and to copy transmitting information to be transmitted to the proxy server to thereby transmit pieces of information having a same content through the one communication network and the other communication network; and
   a communication network switching function to switch the one communication network being used to the other communication network while maintaining the communicating state with the proxy server, and
   the proxy server includes a receiving information processor having a receiving information synthesizing function to synthesize a set of information from pieces of receiving information having a same content received from the mobile terminal through the one communication network and the other communication network.

8. The communication service continuation system, according to claim 7, wherein
   the proxy server includes a transmitting information processor having a copied information transmitting function to activate the other communication network while maintaining the communicating state with the mobile terminal via the one communication network being used, and to copy transmitting information to be transmitted to the mobile terminal, to thereby transmit pieces of transmitting information having the same content through the one communication network and the other communication network, and
   the mobile terminal includes a receiving information processor having a receiving information synthesizing function to synthesize a set of information from the pieces of receiving information of the same content received through the one communication network and the other communication network.

9. A communication service continuation method comprising:
   containing a mobile communication network, a wireless LAN communication network, a network interface communication network, which are provided in parallel, and a public network commonly connected with the communication networks;
   connecting at least two communication networks selected from among the communication networks provided in parallel with a mobile terminal, and connecting the public network with a server;
   in the mobile terminal, performing a copying process with respect to transmitting information to be transmitted to the server, selecting at least two communication networks from among the communication networks provided in parallel, activating another communication network while maintaining a communicating state with the server using one communication network, and transmitting multiple pieces of transmitting information of the same content copied in the copying process via the selected at least two communication networks;
   in the server, performing synthesizing and restoring process with respect to receiving information transmitted from the mobile terminal by recording a latest data from among data received in accordance with a sequence number which is a component of delimiter information included in the receiving information transmitted from the mobile terminal and discarding data which has been received;
   in the server, performing a copying process with respect to transmitting information to be transmitted to the mobile terminal, and transmitting multiple pieces of transmitting information of the same content copied in the copying process via the at least two communication networks selected by the mobile terminal from among the communication networks provided in parallel;
   in the mobile terminal, performing a synthesizing and restoring process with respect to receiving information transmitted from the server by recording a latest data from among data received in accordance with a sequence number which is a component of delimiter information included in the receiving information transmitted from the server via the selected at least two communication networks and discarding data which has been received.

10. The communication service continuation method, according to claim 9, further comprising, before stopping the communicating state of the one communication network, receiving the pieces of information having the same content through the one communication network and the other communication network and synthesizing the pieces of information to be a set of information in the server.

11. The communication service continuation method, according to claim 9, further comprising, after stopping the communicating state of the one communication network, receiving the pieces of information having the same content through the one communication network and the other communication network and synthesizing the pieces of information to be a set of information in the server.

* * * * *